United States Patent
Valerio et al.

(10) Patent No.: US 11,726,826 B2
(45) Date of Patent: Aug. 15, 2023

(54) DYNAMIC LOAD BALANCING OF COMPUTE ASSETS AMONG DIFFERENT COMPUTE CONTEXTS

(71) Applicant: Intel Corporation, Santa Clara, CA (US)

(72) Inventors: James Valerio, North Plains, OR (US); Vasanth Ranganathan, El Dorado Hills, CA (US); Joydeep Ray, Folsom, CA (US); Rahul A. Kulkarni, Bangalore (IN); Abhishek R. Appu, El Dorado Hills, CA (US); Jeffery S. Boles, Folsom, CA (US); Hema C. Nalluri, Hyderabad (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/339,184

(22) Filed: Jun. 4, 2021

(65) Prior Publication Data

US 2022/0129323 A1    Apr. 28, 2022

Related U.S. Application Data

(63) Continuation of application No. 16/367,056, filed on Mar. 27, 2019, now Pat. No. 11,074,109.

(51) Int. Cl.
*G06F 9/50* (2006.01)
*G06F 9/48* (2006.01)
(Continued)

(52) U.S. Cl.
CPC .......... *G06F 9/5038* (2013.01); *G06F 9/3822* (2013.01); *G06F 9/3867* (2013.01);
(Continued)

(58) Field of Classification Search
None
See application file for complete search history.

(56) References Cited

U.S. PATENT DOCUMENTS

| 10,176,550 | B1 * | 1/2019 | Baggerman | G06T 1/60 |
| 2007/0091088 | A1 * | 4/2007 | Jiao | G06T 15/005 345/426 |

(Continued)

OTHER PUBLICATIONS

Context allocation—Windows drivers | Microsoft Docs, "Context allocation", Apr. 19, 2017 taken from https://docs.microsoft.com/en-us/windows-hardware/drivers/display/contextallocation Jun. 25, 2019, 2 pages.

(Continued)

*Primary Examiner* — Isaac Tuku Tecklu
(74) *Attorney, Agent, or Firm* — Compass IP Law PC

(57) ABSTRACT

Examples are described here that can be used to allocate commands from multiple sources to performance by one or more segments of a processing device. For example, a processing device can be segmented into multiple portions and each portion is allocated to process commands from a particular source. In the event a single source provides commands, the entire processing device (all segments) can be allocated to process commands from the single source. When a second source provides commands, some segments can be allocated to perform commands from the first source and other segments can be allocated to perform commands from the second source. Accordingly, commands from multiple applications can be executed by a processing unit at the same time.

21 Claims, 28 Drawing Sheets

(51) Int. Cl.
    *G06T 1/20*     (2006.01)
    *G06F 9/38*     (2018.01)

(52) U.S. Cl.
    CPC .......... *G06F 9/4881* (2013.01); *G06F 9/5066* (2013.01); *G06T 1/20* (2013.01)

(56) References Cited

U.S. PATENT DOCUMENTS

| | | | | |
|---|---|---|---|---|
| 2009/0189896 | A1* | 7/2009 | Jiao | G06T 15/005 345/426 |
| 2010/0123717 | A1* | 5/2010 | Jiao | G06T 15/005 345/426 |
| 2013/0300655 | A1* | 11/2013 | Cameron | G06F 9/5016 345/157 |
| 2015/0128136 | A1* | 5/2015 | Rafique | G06T 1/20 718/1 |
| 2015/0371354 | A1* | 12/2015 | Petersen | G06F 9/5083 345/522 |
| 2015/0371355 | A1* | 12/2015 | Chen | G06F 9/45533 345/505 |
| 2017/0256018 | A1* | 9/2017 | Gandhi | G06T 1/20 |
| 2017/0262952 | A1* | 9/2017 | Sarna | G06F 9/4881 |
| 2018/0108106 | A1* | 4/2018 | Socarras | G06T 15/005 |
| 2018/0165786 | A1* | 6/2018 | Bourd | G06T 1/20 |
| 2019/0034326 | A1 | 1/2019 | Nalluri et al. | |
| 2019/0087143 | A1* | 3/2019 | Begeman | G06F 3/14 |
| 2019/0102859 | A1* | 4/2019 | Hux | G06T 1/20 |
| 2019/0213776 | A1* | 7/2019 | Banerjee | G06F 9/4881 |
| 2019/0235928 | A1* | 8/2019 | Duluk, Jr. | G06F 9/5061 |
| 2019/0325554 | A1* | 10/2019 | Kelly | H04N 13/351 |
| 2020/0004460 | A1* | 1/2020 | Gould | G06F 3/0613 |
| 2020/0043123 | A1* | 2/2020 | Dash | G06F 9/4881 |
| 2022/0129323 | A1* | 4/2022 | Valerio | G06F 9/3822 |

OTHER PUBLICATIONS

First Office Action for U.S. Appl. No. 16/367,056, dated Aug. 4, 2020, 13 pages.
Intel, "Intel® Open Source HD Graphics Programmers' Reference Manual (PRM)", vol. 3: GPU Overview, Jun. 2015, Revision 1.0, 35 pages.
Notice of Allowance for U.S. Appl. No. 16/367,056, dated Mar. 12, 2021, 23 pages.
Stephen Junkins, "The Compute Architecture of Intel® Processor Graphics Gen7.5", Version 1.0, Aug. 1, 2014, 16 pages.
Yu-Kwong Kwok, et al., "Static Scheduling Algorithms for Allocating Directed Task Graphs to Multiprocessors", ACM Computing Surveys (CSUR) Dec. 1999, vol. 31 Issue 4, 66 pages.

* cited by examiner

GRAPHICS PROCESSOR COMMAND FORMAT
900

GRAPHICS PROCESSOR COMMAND SEQUENCE
910

DYNAMIC LOAD BALANCING OF COMPUTE ASSETS AMONG DIFFERENT COMPUTE CONTEXTS

CROSS-REFERENCE TO RELATED APPLICATIONS

This application is a continuation of U.S. patent application Ser. No. 16/367,056, filed Mar. 27, 2019. The entire specification of which is hereby incorporated herein by reference in its entirety.

FIELD

Embodiments generally to the field of graphics processors and workload execution.

RELATED ART

Digital image generation, processing, and display are widely performed and employed by computing systems and computer-executed applications. For example, smart phones, smart homes, security systems, self-driving vehicles, and computer gaming applications generate digital images or employ image processing. In some cases, two dimensional (2D) or three dimensional (3D) images are generated and displayed by a computer system.

A processing device can be programmed to handle workloads from various sources. However, in some cases of allocating the processing device to handle workloads from various sources, the processing device can be under-utilized. For example, in a time-sliced use of a graphics processing unit (GPU), a GPU can be allocated to process contexts from a single application at a time. If a second application requests to submit contexts for processing to the GPU, the second application must wait for in-process threads from the first application to complete, even if the GPU has spare capacity to handle threads from the second application. Context and resulting data from the first application's use of the GPU are cleared from memory before a context from the second application can use the GPU. In other words, a single application and single context can use GPU at a time.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

EXEMPLARY GRAPHICS PROCESSOR ARCHITECTURES AND DATA TYPES

System Overview

Figure 1:
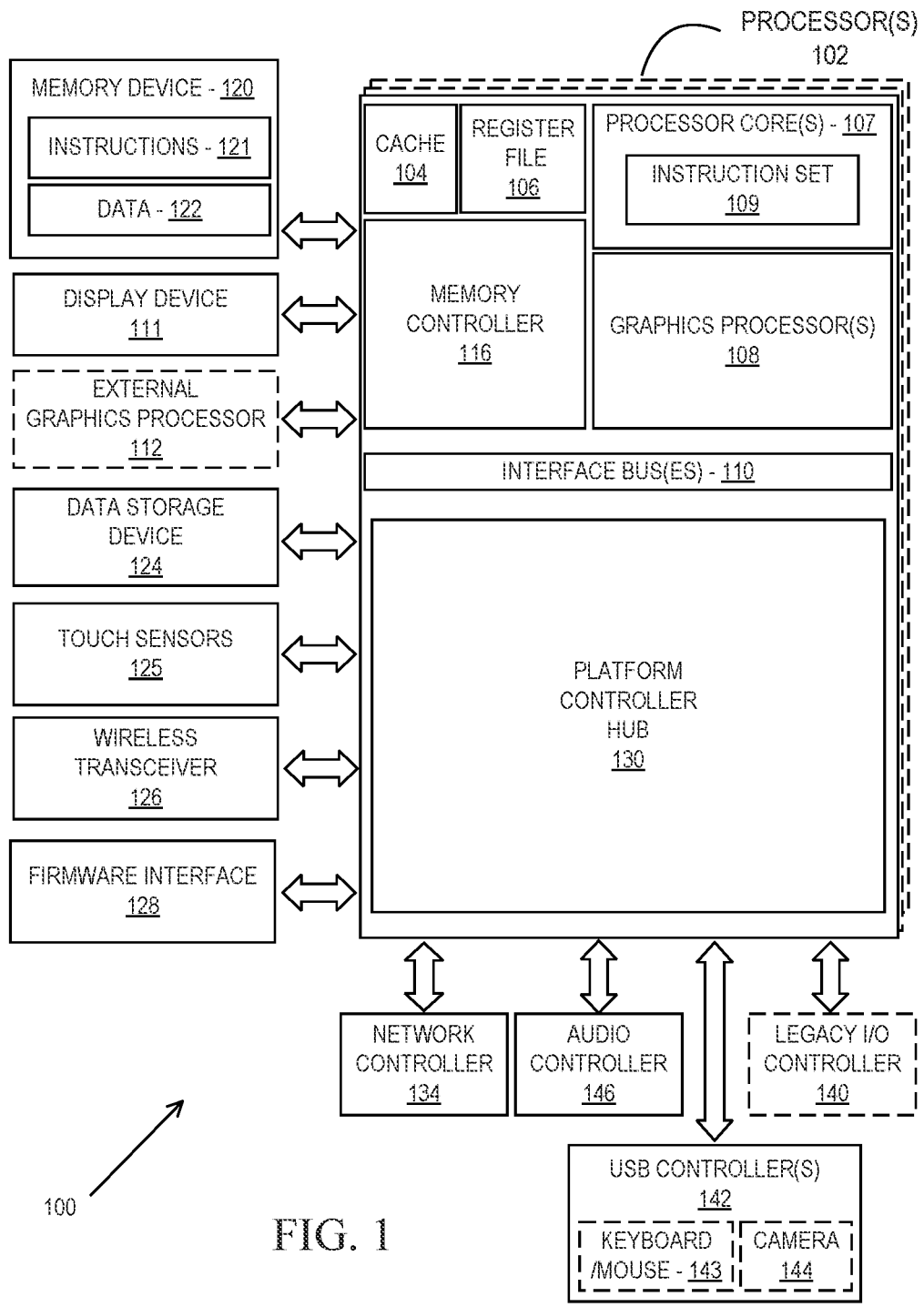
FIG. 1 is a block diagram of an embodiment of a computer system with a processor having one or more processor cores and graphics processors.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device.

In an embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 2:
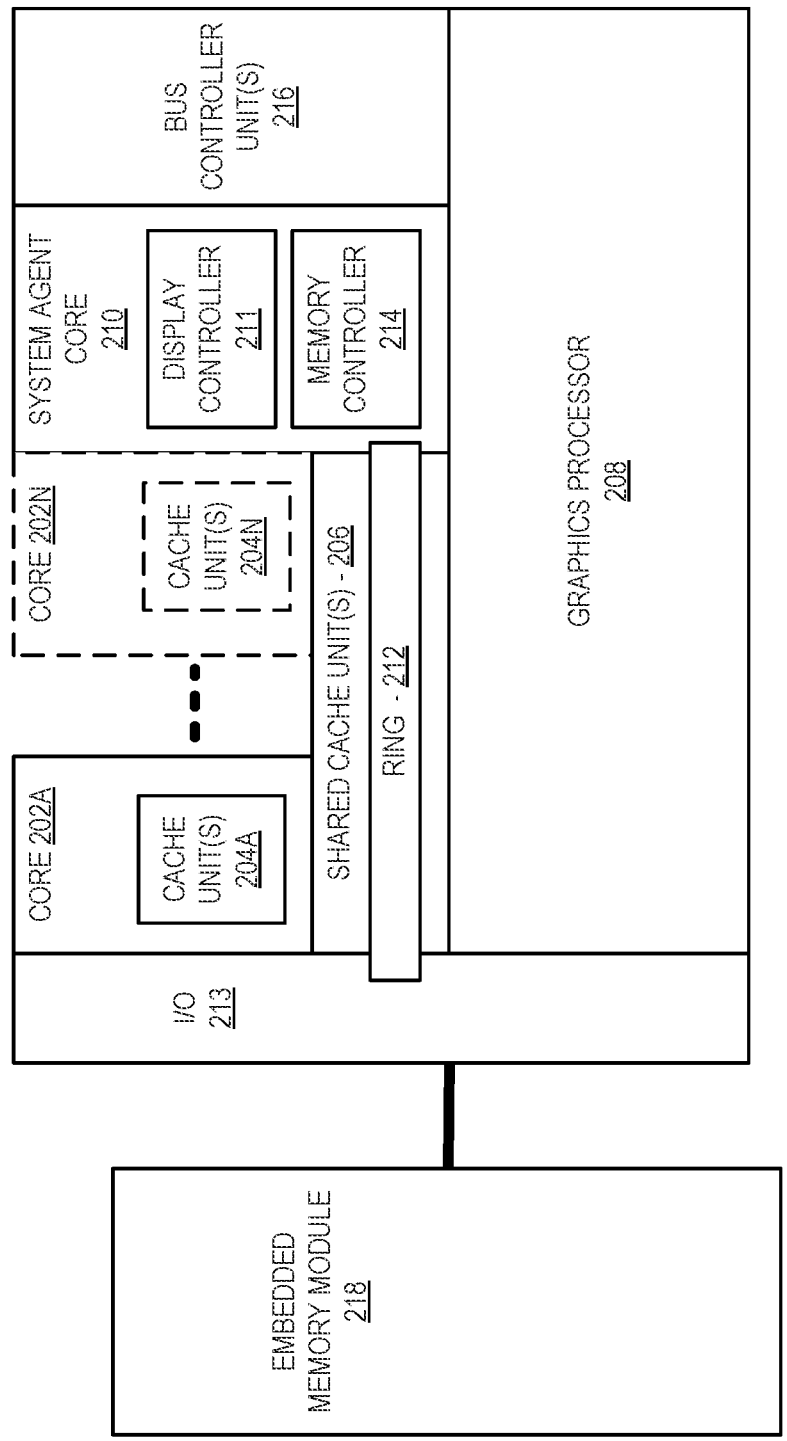
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 3:
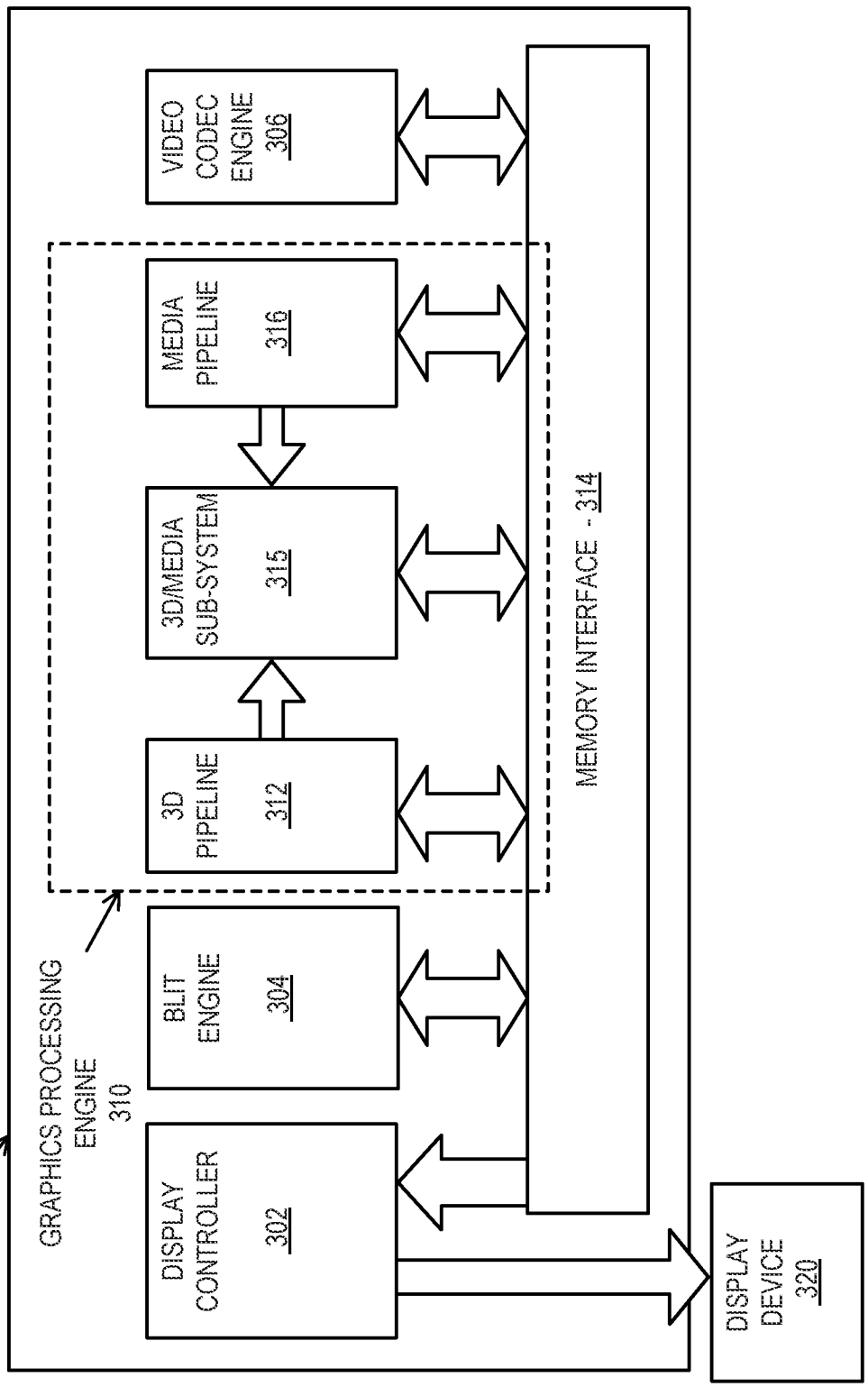
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
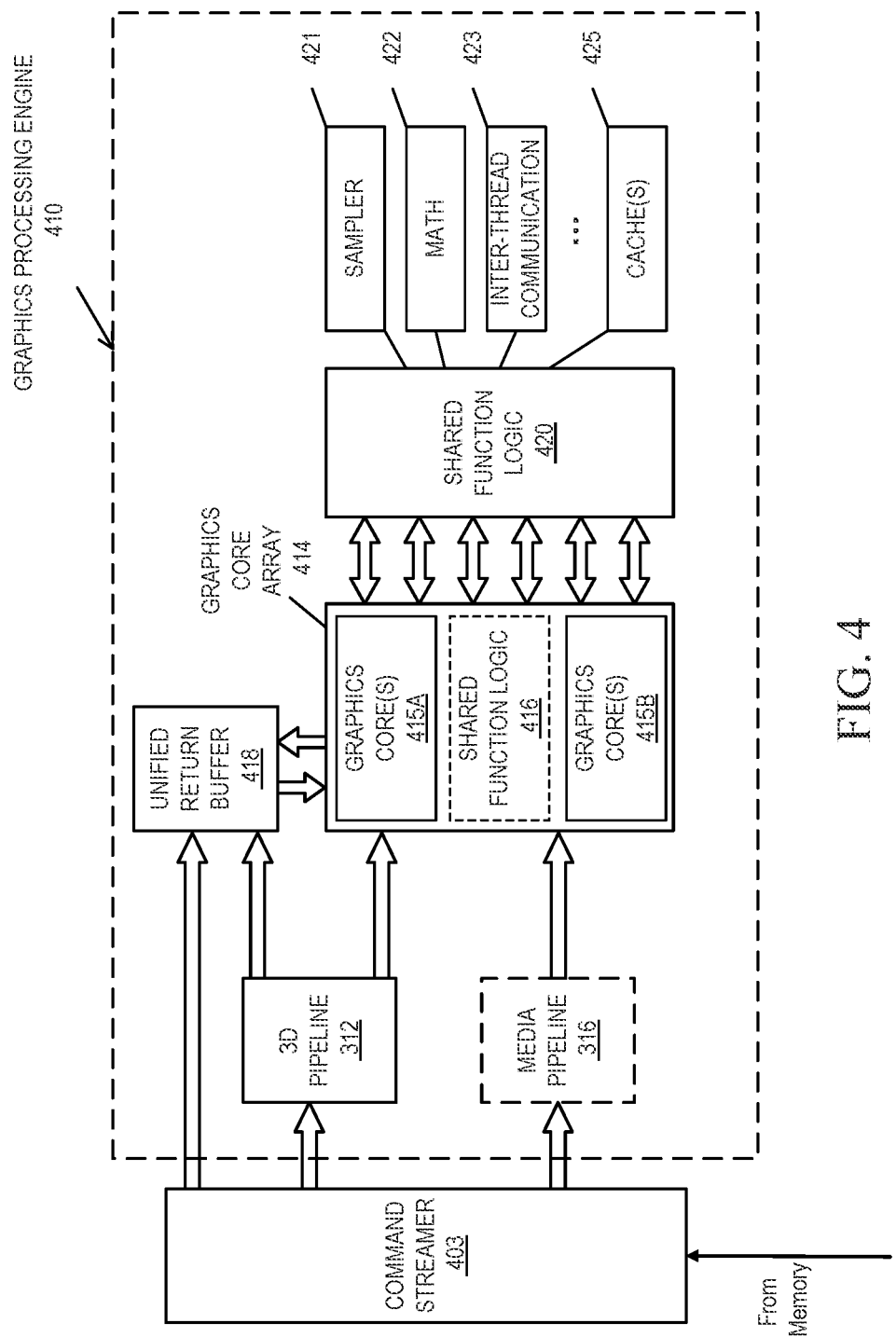
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
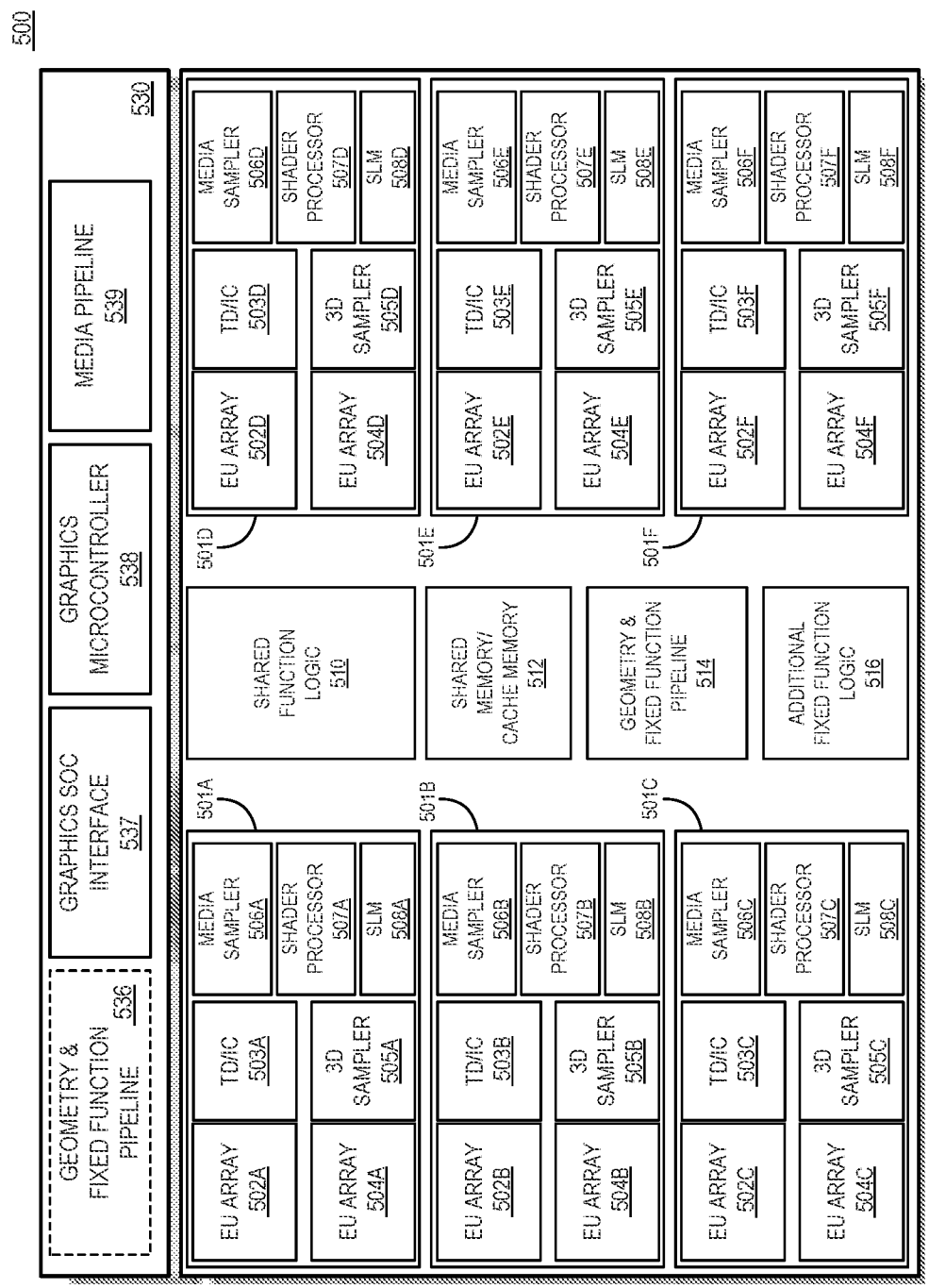
FIG. 5 is a block diagram of another embodiment of a graphics processor.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics processor core 500 can include a fixed function block 530 coupled with multiple sub-cores 501A-501F, also referred to as sub-slices, that include modular blocks of general-purpose and fixed function logic.

In some embodiments, the fixed function block 530 includes a geometry/fixed function pipeline 536 that can be shared by all sub-cores in the graphics processor core 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics processor core 500 and other processor cores within a system on a chip integrated circuit. The graphics microcontroller 538 is a programmable sub-processor that is configurable to manage various functions of the graphics processor core 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics processor core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics processor core 500 and CPUs within the SoC. The SoC interface 537 can also implement power management controls for the graphics processor core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics processor core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics processor core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics processor core 500, providing the graphics processor core 500 with the ability to save and restore registers within the graphics processor core 500 across low-power state transitions independently from the operating system and/or graphics driver software on the system.

The graphics processor core 500 may have greater than or fewer than the illustrated sub-cores 501A-501F, up to N modular sub-cores. For each set of N sub-cores, the graphics processor core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics processor core 500. The shared and/or cache memory 512 can be a last-level cache for the set of N sub-cores 501A-501F within the graphics processor core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics processor core 500 includes additional fixed function logic 516 that can include various fixed function acceleration logic for use by the graphics processor core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
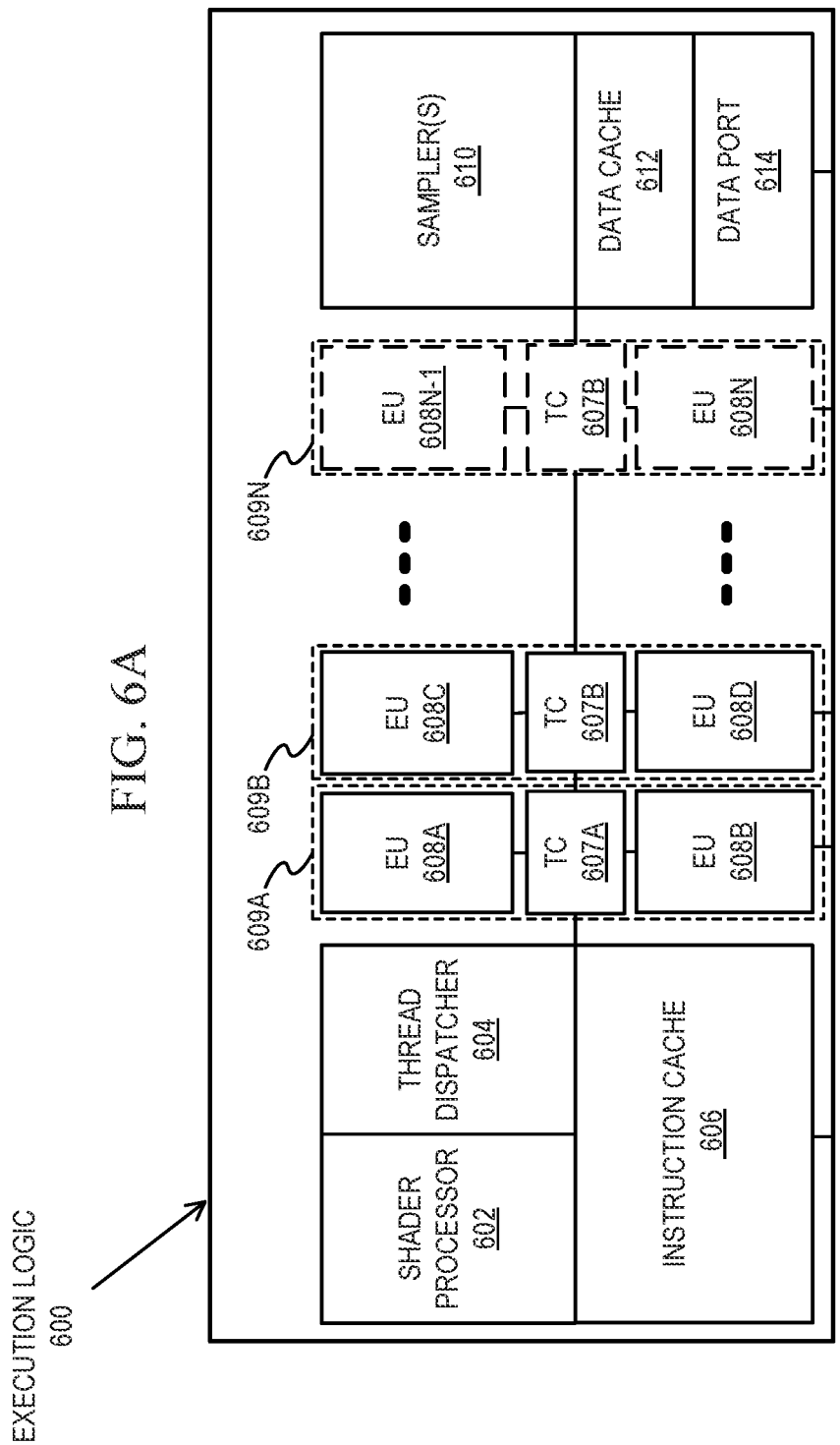
FIGS. 6A and 6B are block diagrams of thread execution logic including an array of processing elements.
Figure 6B:
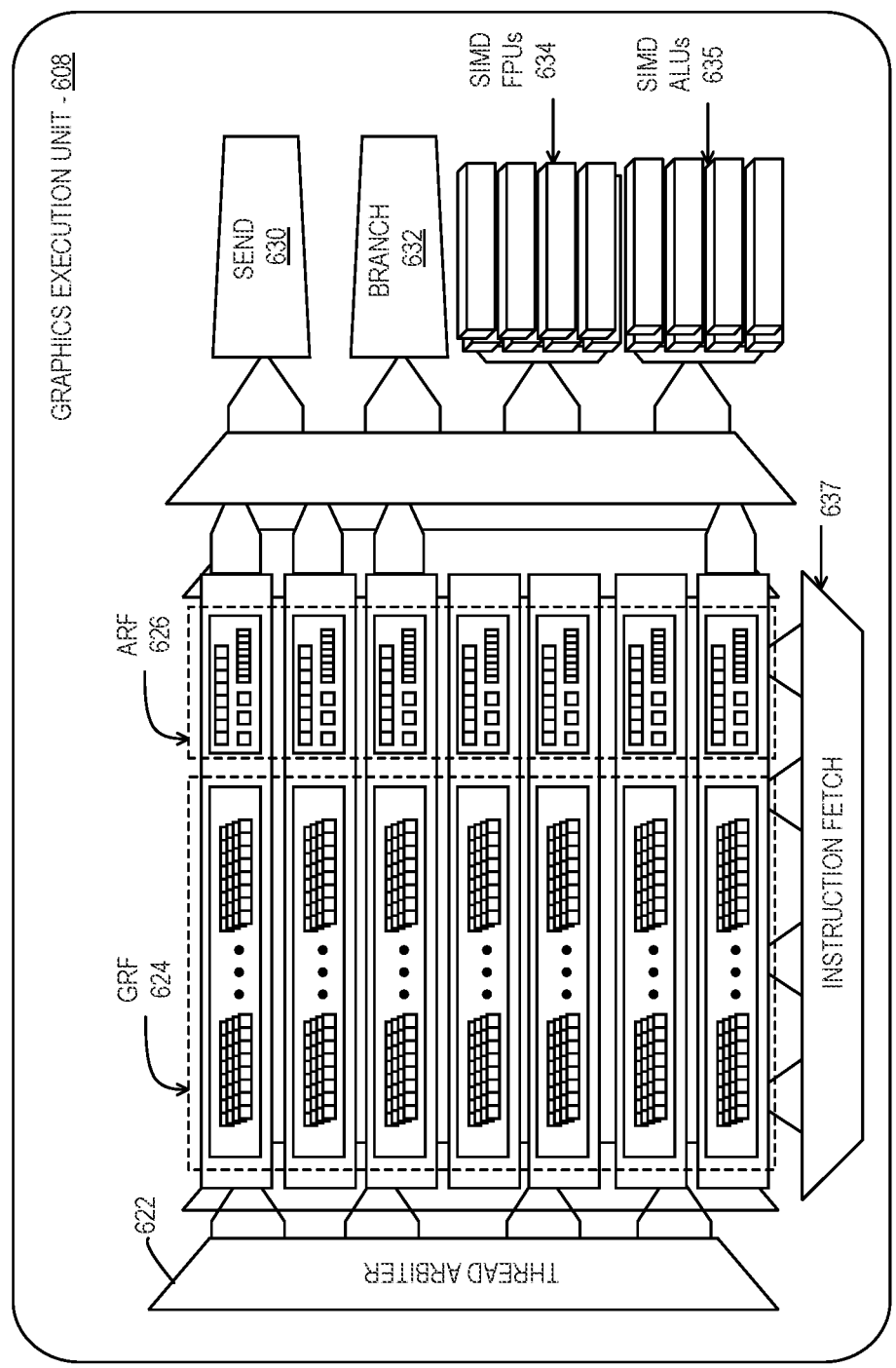

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 632, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2 M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can choose the exact number of execution units per sub-core grouping. In one embodiment the execution unit 608 can execute instructions across a plurality of execution channels. In a further embodiment, each thread executed on the graphics execution unit 608 is executed on a different channel.

Figure 7:
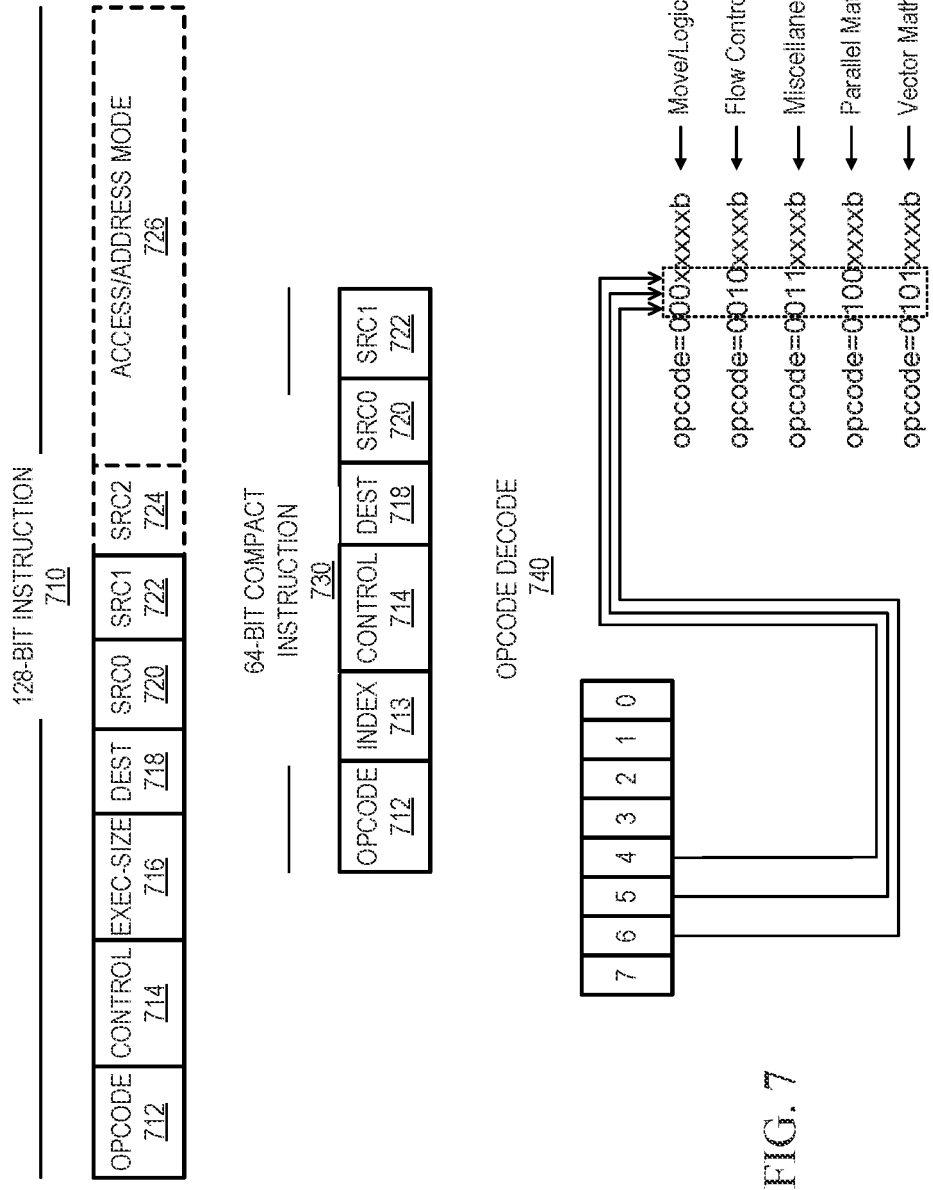
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
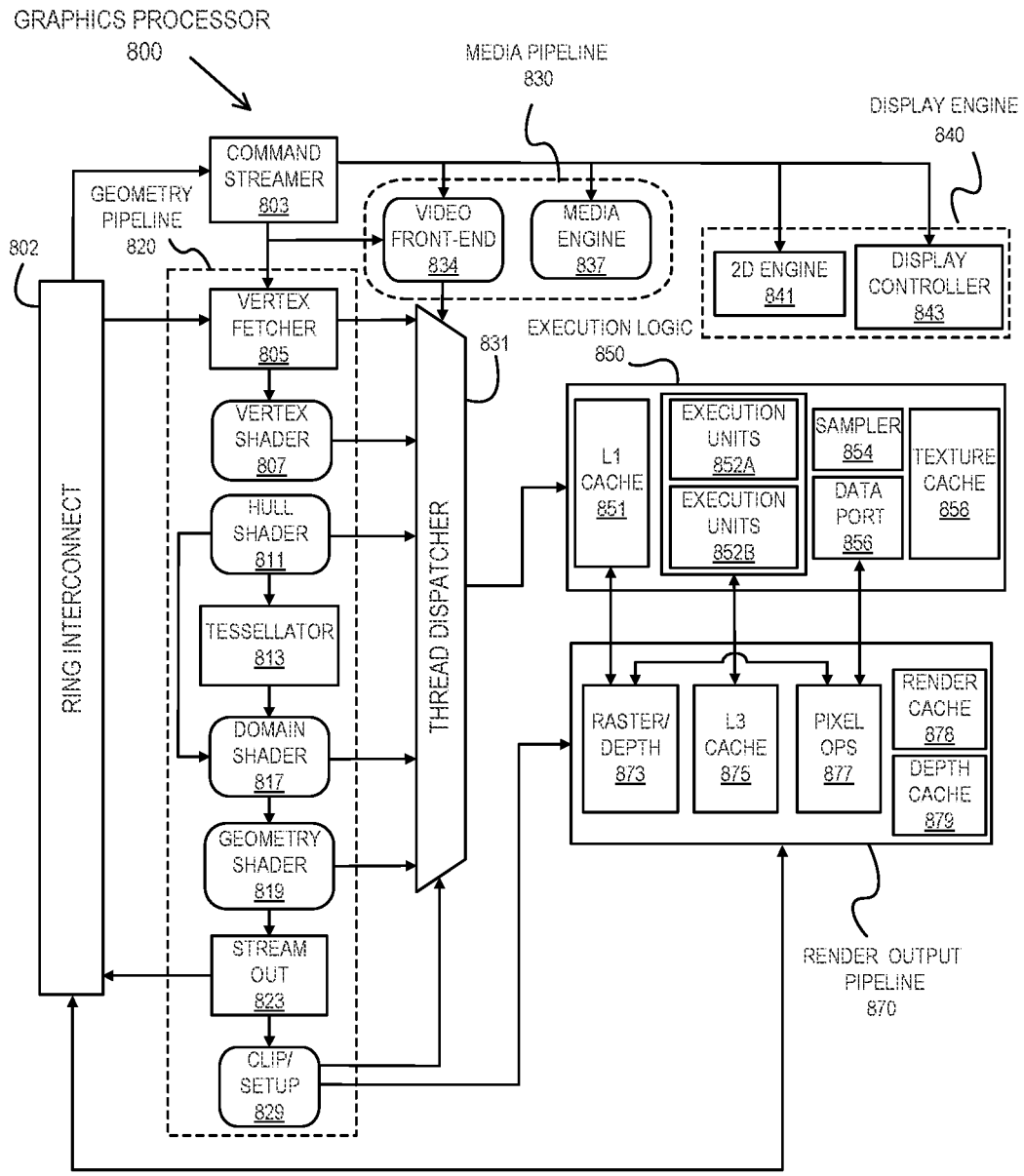
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled, the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
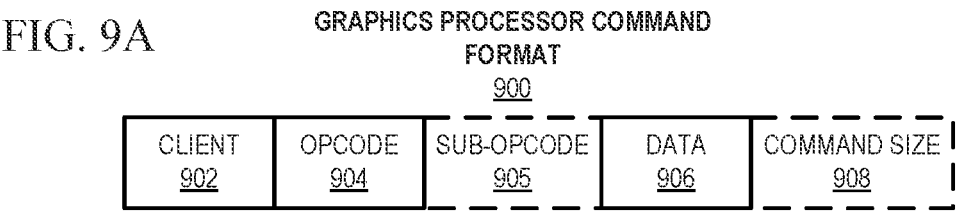
FIG. 9A is a block diagram illustrating a graphics processor command format according to an embodiment.
Figure 9B:
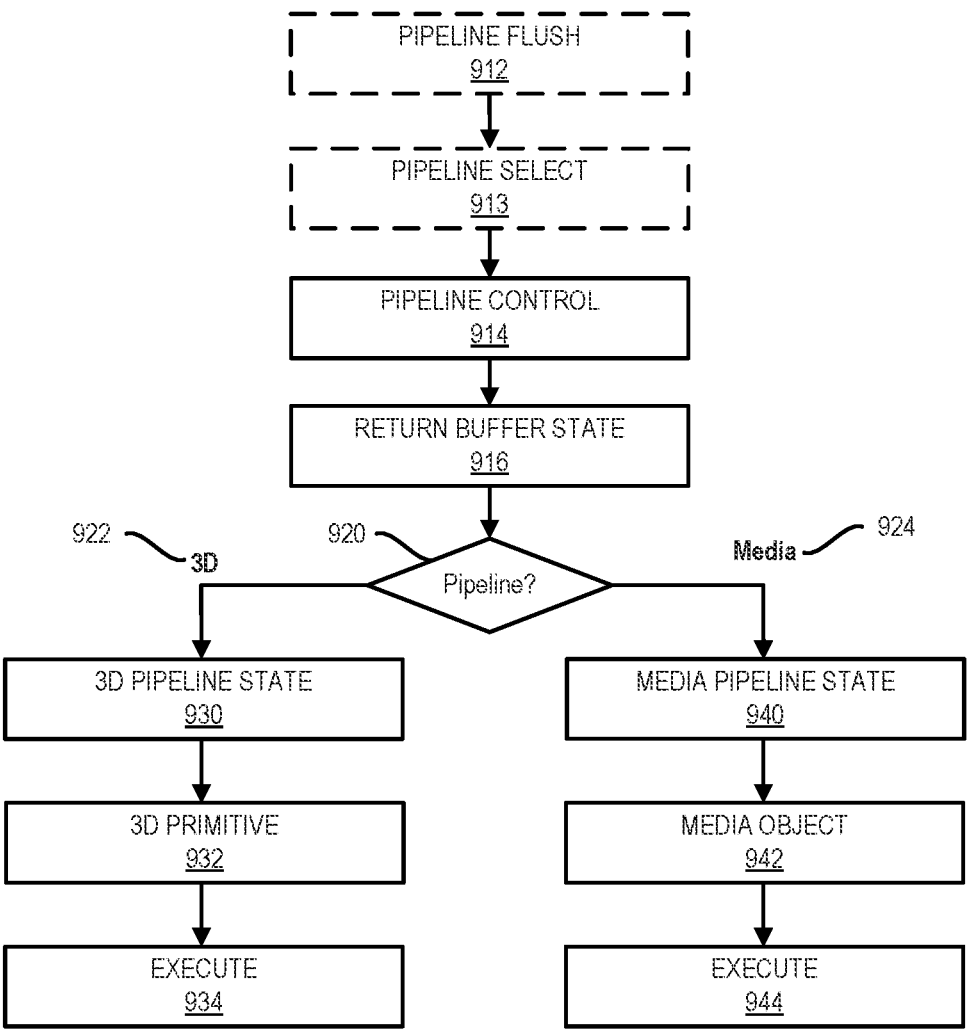
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands The exemplary graphics processor command format 900 of FIG. 9A includes data fields to identify a client 902, a command operation code (opcode) 904, and data 906 for the command A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands Once the command is received by the client unit, the client unit reads the opcode 904 and, if present, sub-opcode 905 to determine the operation to perform. The client unit performs the command using information in data field 906. For some commands an explicit command size 908 is expected to specify the size of the command In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments, execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
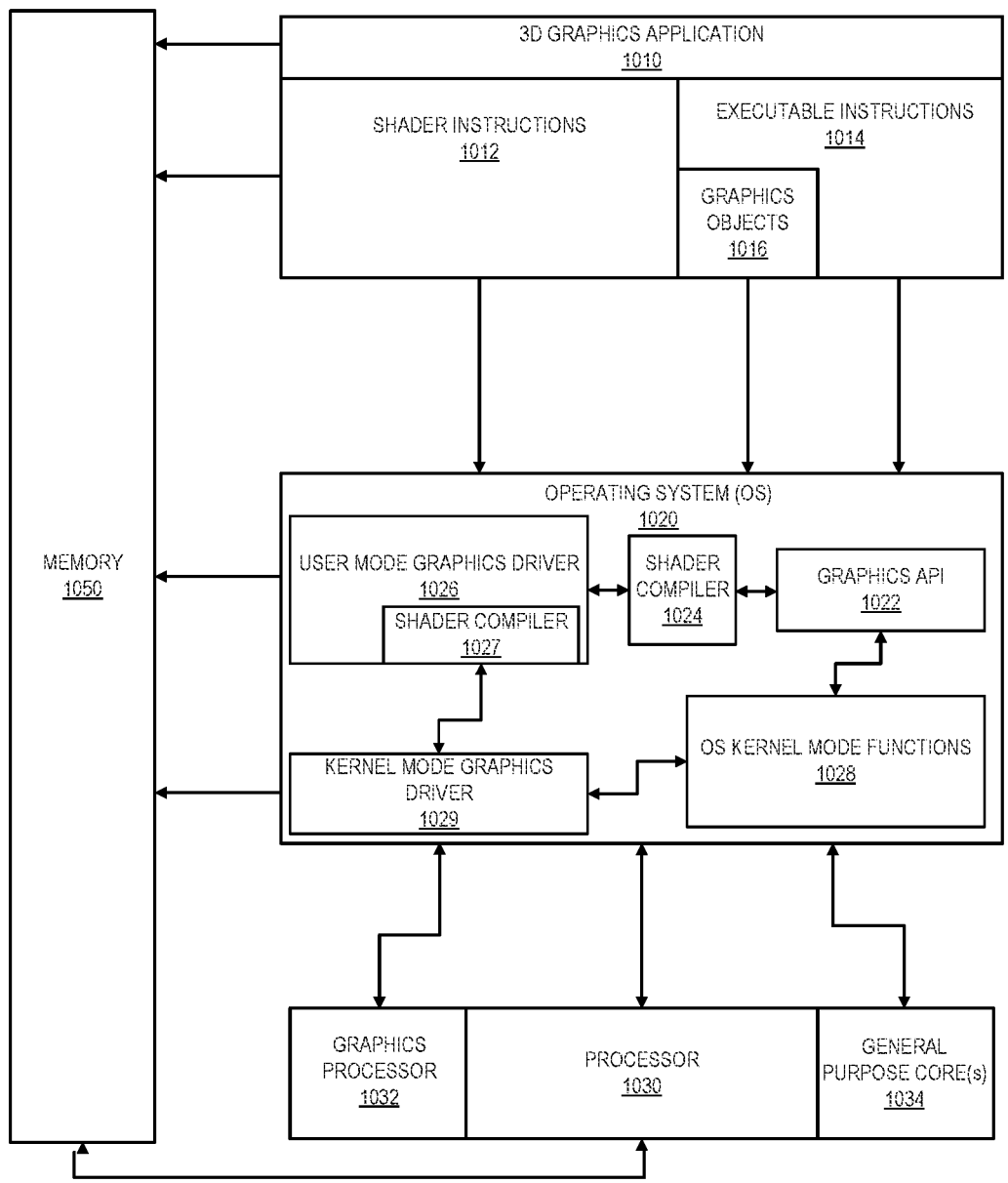
FIG. 10 illustrates exemplary graphics software architecture for a data processing system according to an embodiment.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL), Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
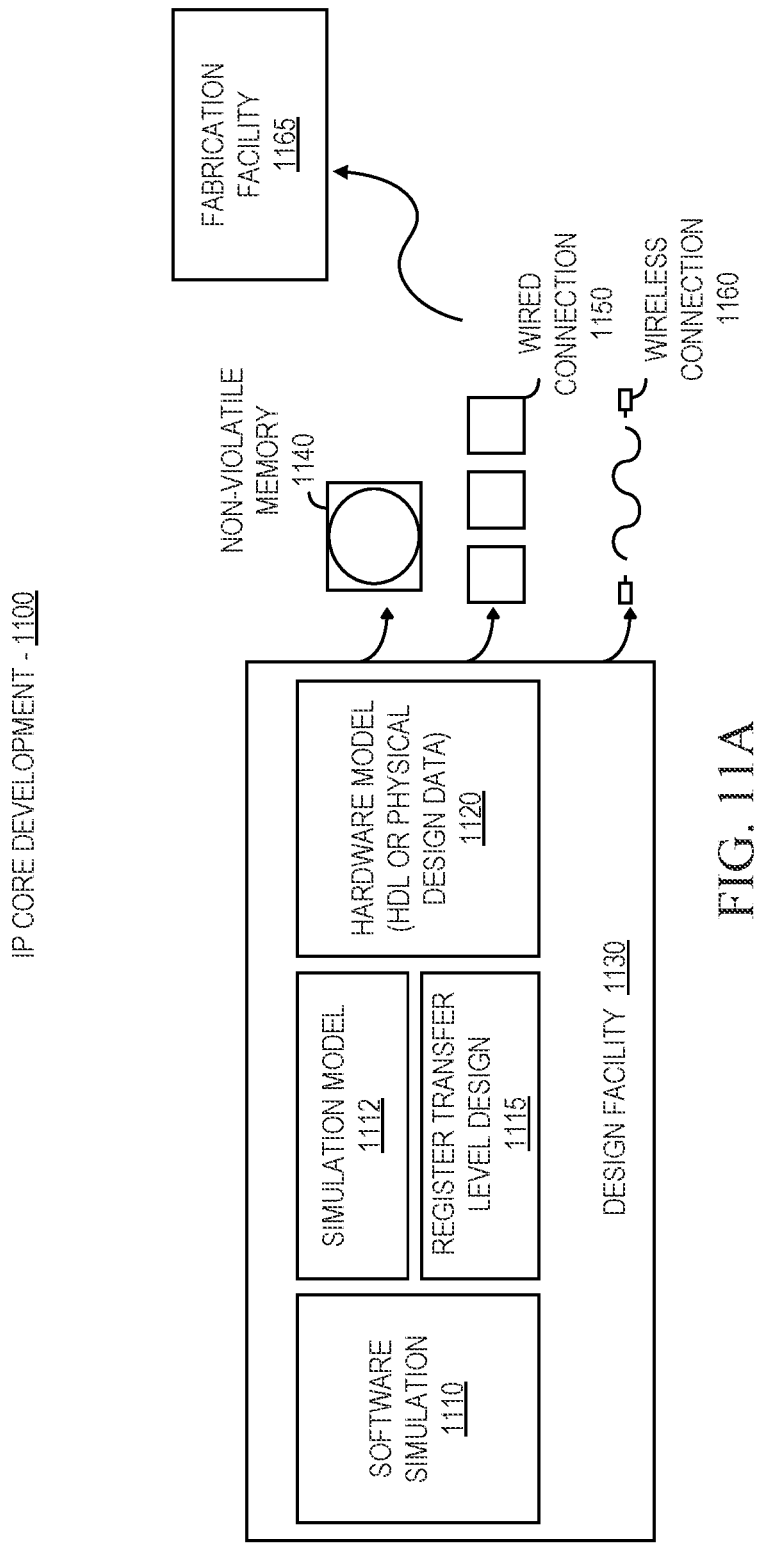
FIGS. 11A and 11B illustrate exemplary IP core development systems that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
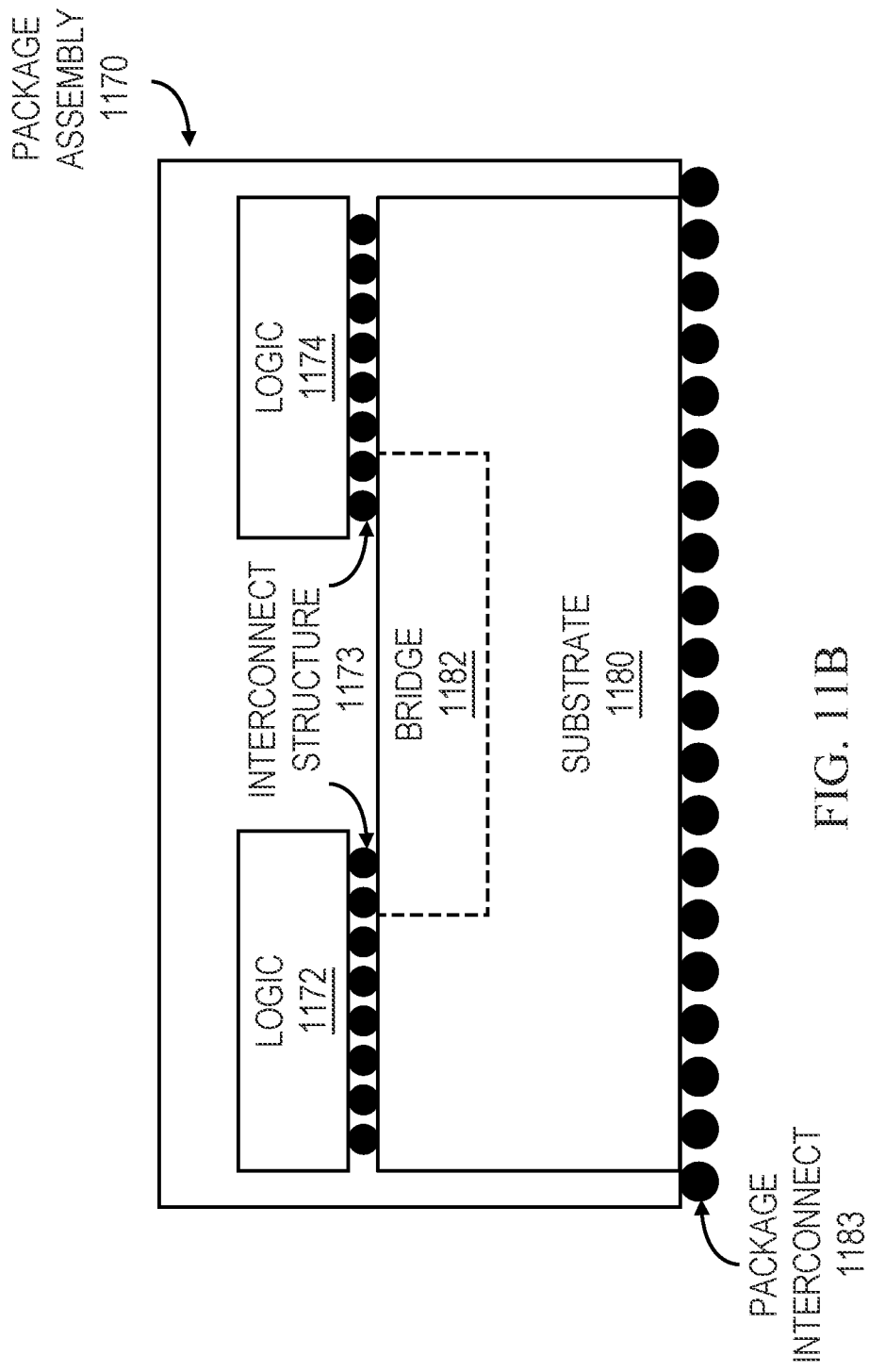

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
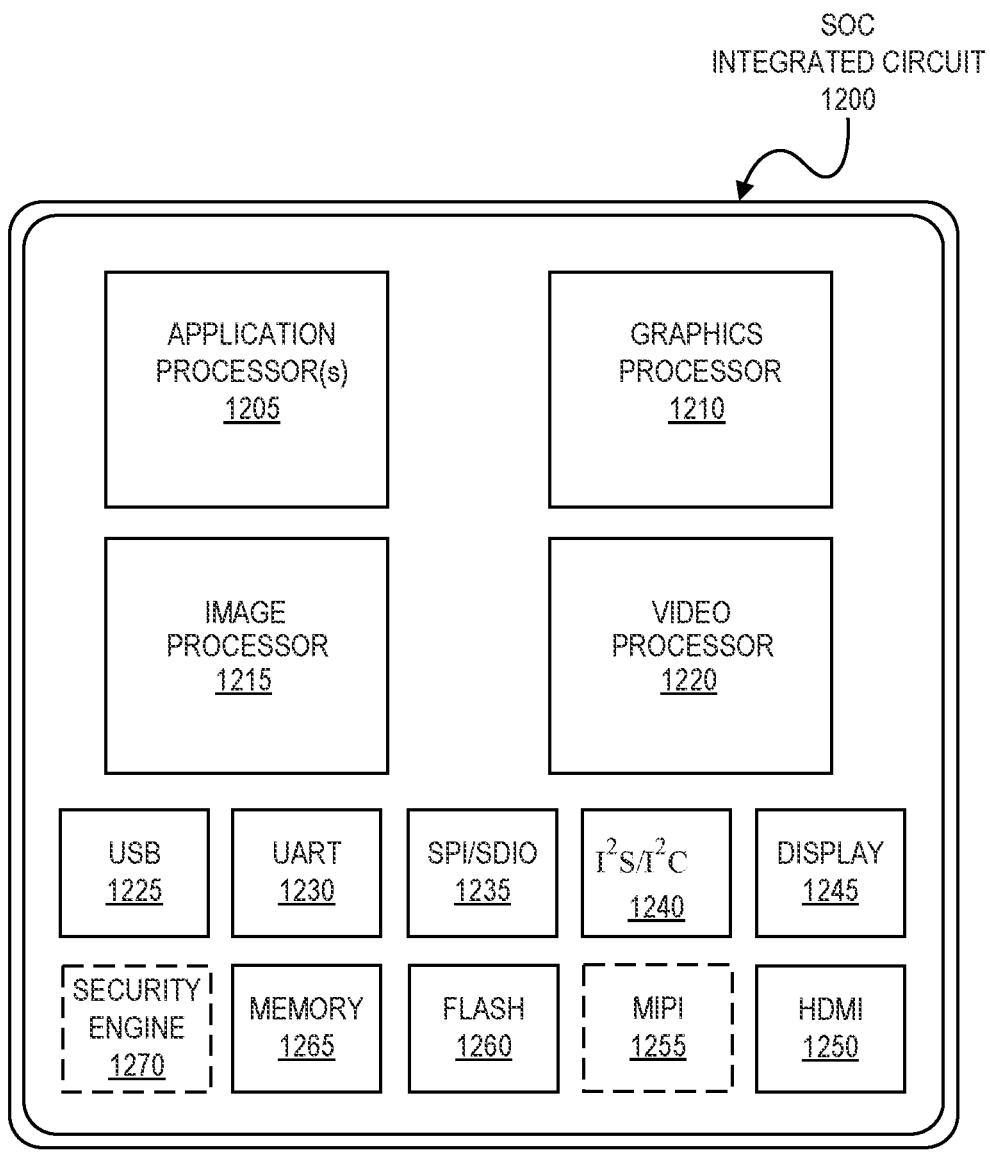
FIG. 12 illustrates an exemplary system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
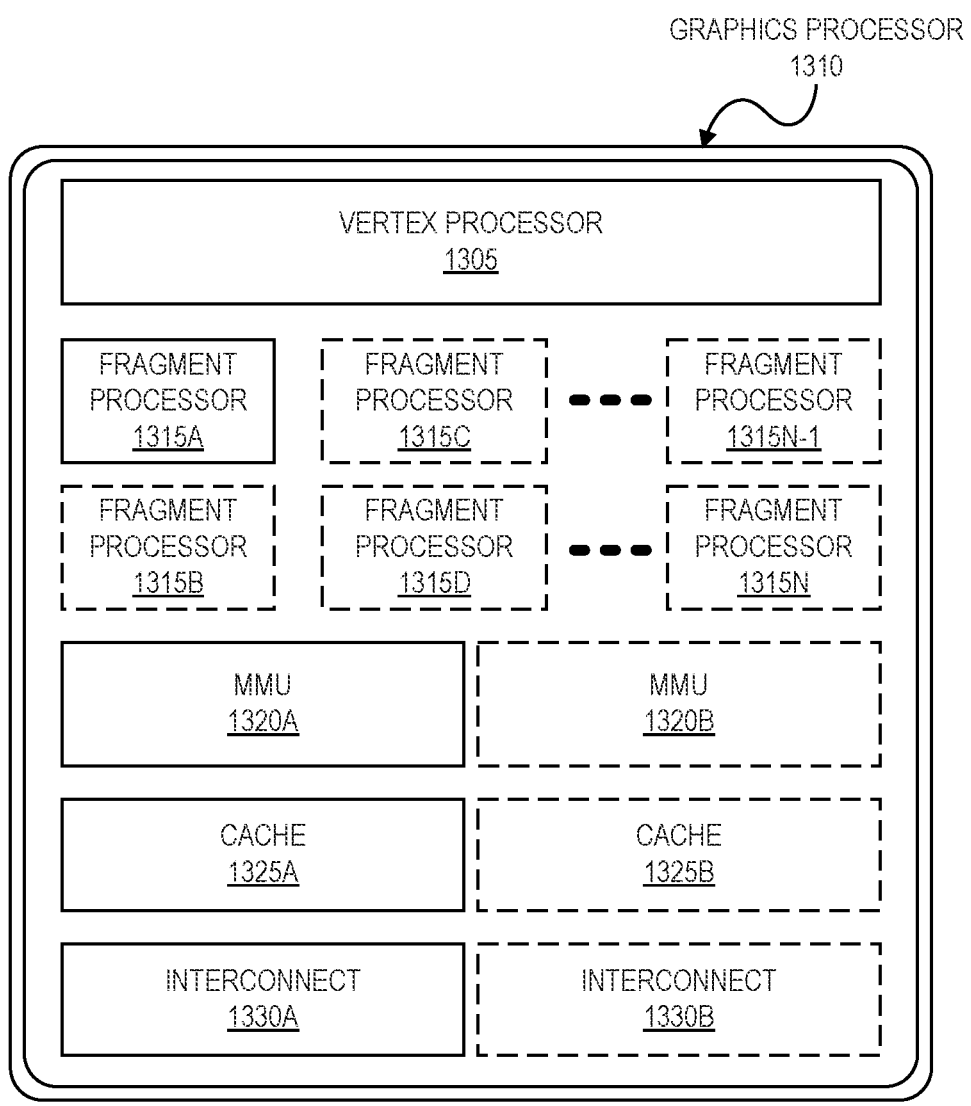
FIGS. 13A and 13B illustrate an exemplary graphics processor of a system on a chip integrated circuit that may be fabricated using one or more IP cores.
Figure 13B:
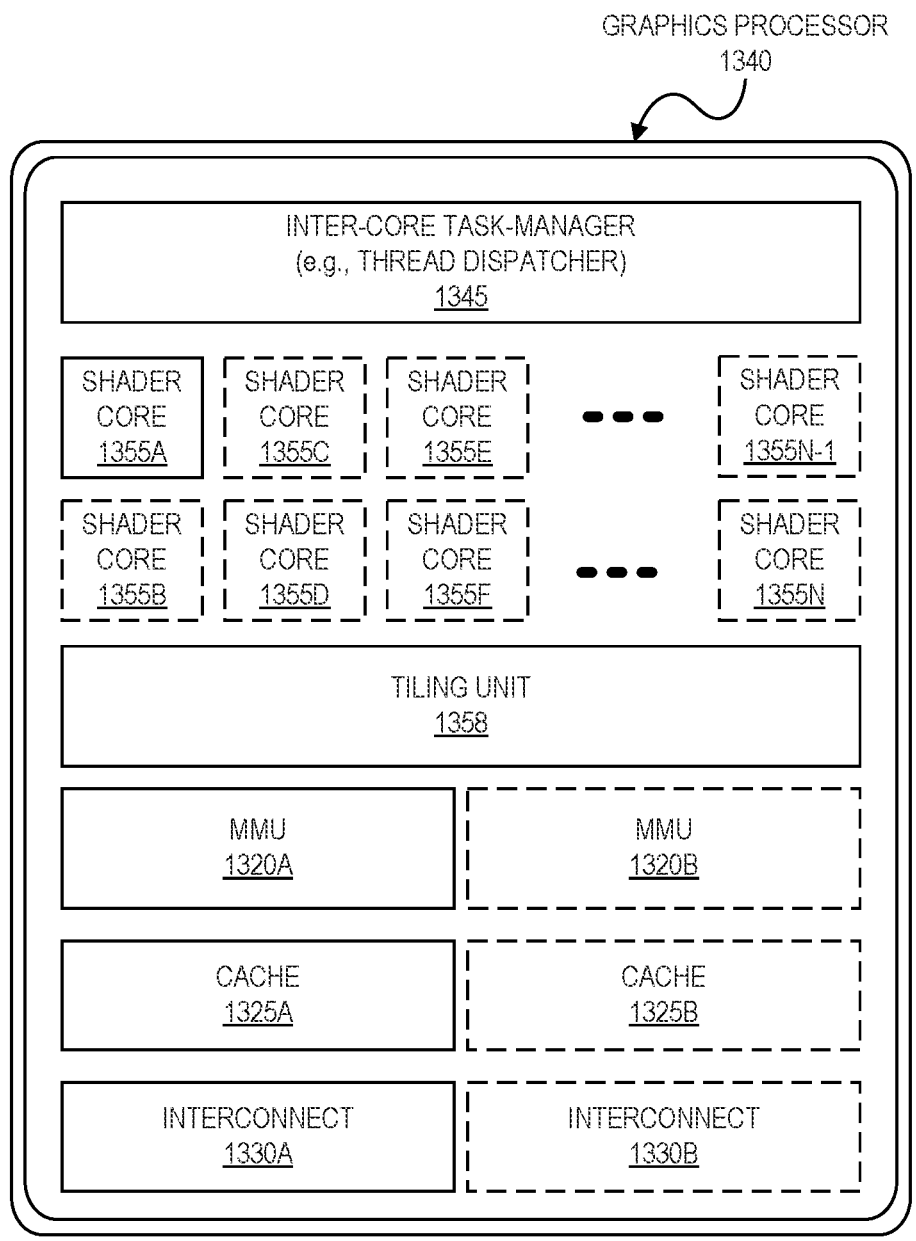

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
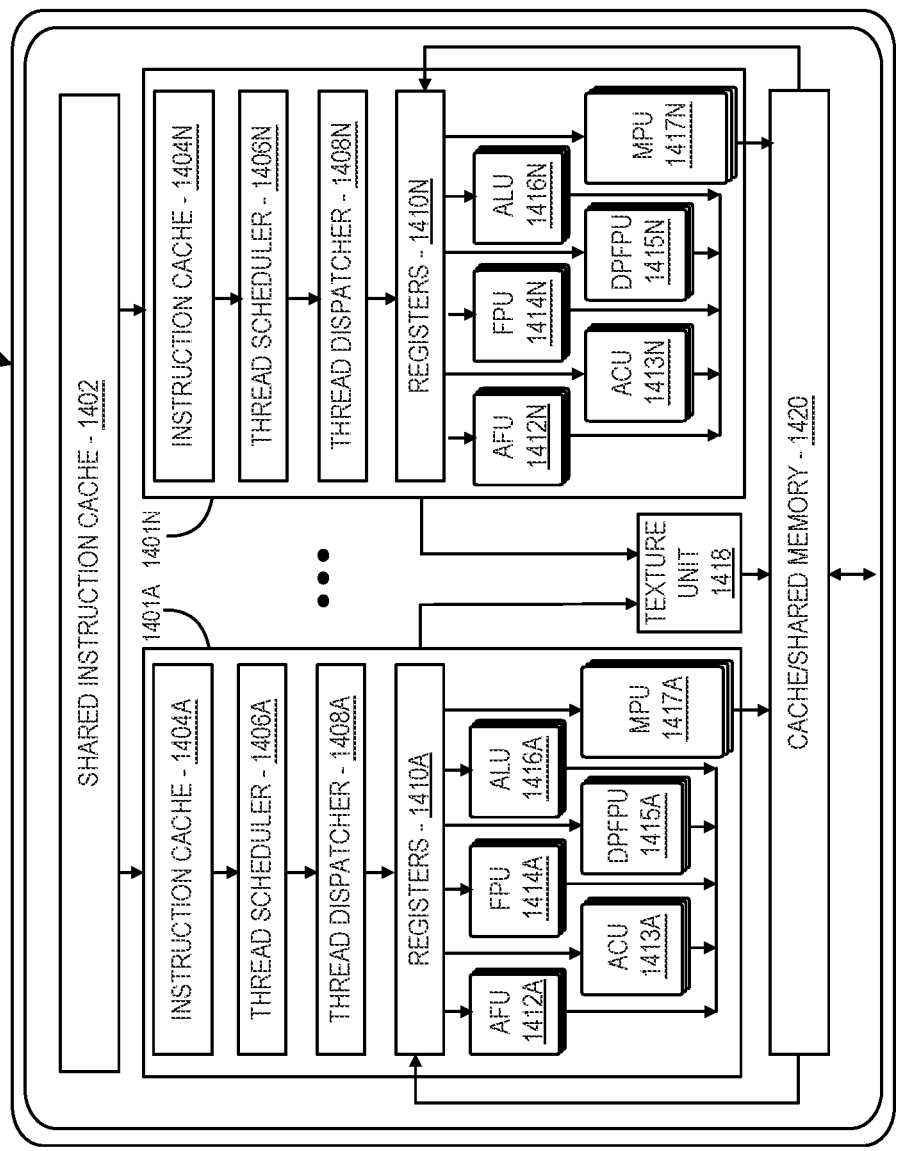
FIGS. 14A and 14B illustrate an additional exemplary graphics processor of a system on a chip integrated circuit that may be fabricated using one or more IP cores.
Figure 14B:
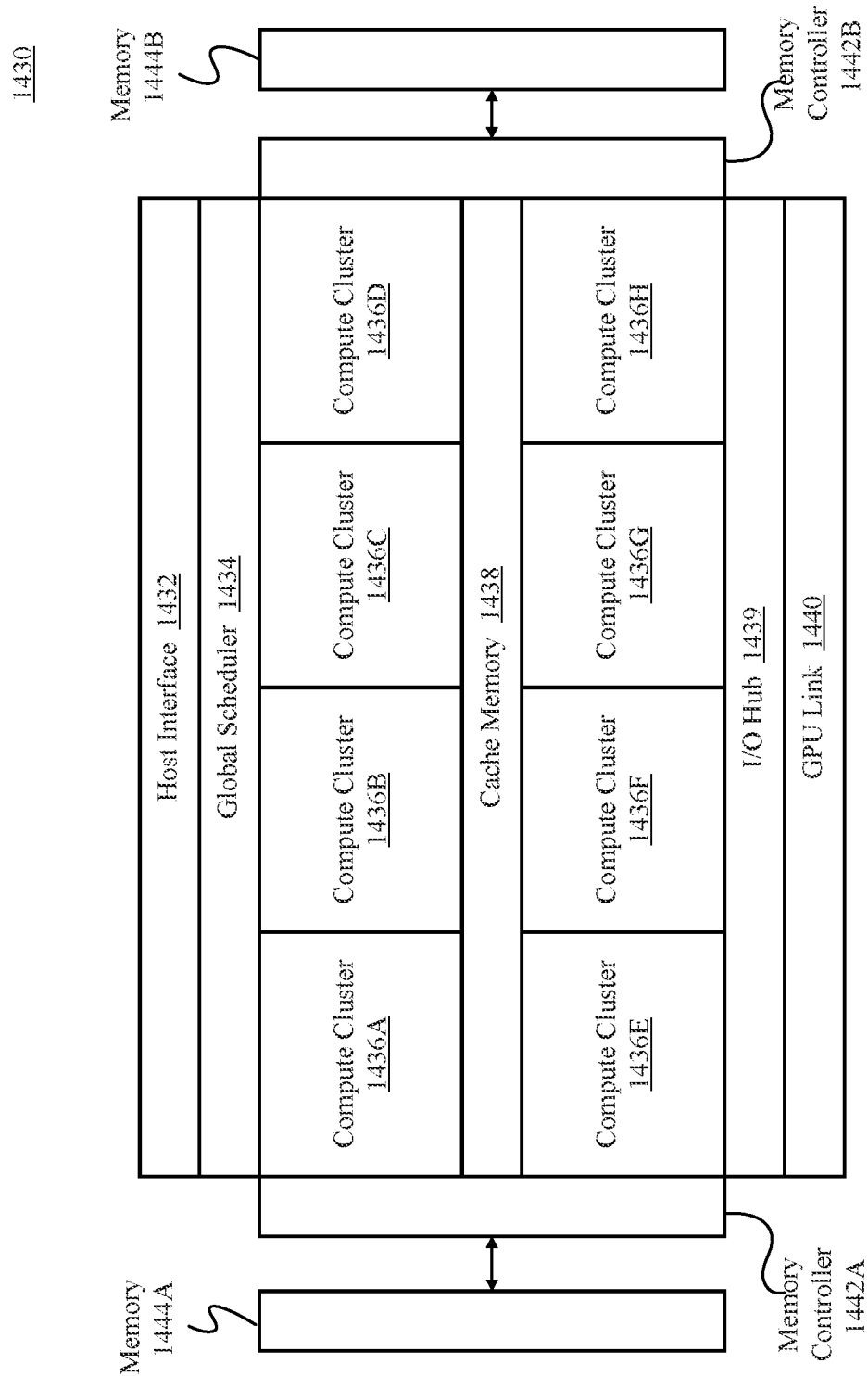

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates an additional general-purpose graphics processing unit 1430, which is a highly-parallel general-purpose graphics processing unit suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A-1440N. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1444A-1444B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit (or other sized) integer dot product instructions, which are commonly used during inferencing operations for deployed neural networks.

Examples of Executions of Multiple Commands

A traditional way of mapping compute contexts to compute resources (e.g., execute units (EUs)) involves static allocation using software. But to scale up mapping of compute contexts to compute resources on larger graphics processing units (GPUs), static allocation or involving software to intervene for scaling up may not be feasible for machine utilization or performance. In addition, historically, an entire GPU has been provisioned to process either 3D contexts or compute contexts but not both and so a GPU may not be able to scale to process different types and numbers of contexts.

A GPU performs work based on submitted contexts. In some GPU systems, submitted contexts are executed serially. For example, a GPU reads data associated with contexts from memory, performs work on the data using associated kernels or processes, and writes results to memory. For serial execution of contexts, data isolation concerns can arise between steps of memory read and write. According to some embodiments, to assist with data isolation, the GPU state can be cleared between context submissions.

Various embodiments allow for independent applications to execute workloads at the same time using a shared computing resource such as a graphics processing unit (GPU). Various embodiments can support asynchronous concurrent execution of two or more contexts of the same or different type from different applications using a shared computing resource. A computing resource can automatically manage the compute assets dynamically based on the number of active running compute contexts from one or more compute context streamers. For example, a compute resource can use a workload mapping table to map a context to one or more segments of the compute resource for execution. An application or driver may not be used to intervene to manage the compute resource activity every time a context terminates or becomes active. In some embodiments, execution of active contexts can continue while new contexts are received.

For example, in a situation where a first (single) compute context streamer provides contexts for execution and a compute resource provides four quadrants of execution units, then all four quadrants can be allocated to execution of the compute contexts from the first compute context streamer. After completion of execution of compute contexts from the first compute context streamer in a quadrant, the quadrant can return to a state of inactivity and be available for execution of a workload associated with the first compute context streamer.

In the event a compute context from a second compute context streamer is received while any context associated with the first compute context streamer is executed on a quadrant, the context associated with the second compute context streamer is assigned to a particular quadrant for execution according to a workload distribution scheme. If the assigned quadrant is executing a workload associated with a context from the first compute context streamer, then the workload associated with the second compute context streamer is provided for execution by the assigned quadrant after the assigned quadrant has completed executing the workload associated with the first compute context streamer. If the assigned quadrant is inactive or idle, then the workload (e.g., threads, commands, or contexts) associated with the second compute context streamer is provided for execution by the assigned quadrant. According to the workload distribution scheme for two active compute context streamers, workloads associated with the first compute context streamer can be provided to the quadrants assigned by the workload distribution scheme but not to quadrants assigned for execution of workloads from the second compute context streamer.

Receipt of a third compute context while workloads from first and second compute context streamers are actively executed can cause allocation of compute contexts according to a workload distribution scheme among quadrants for three compute context streamers. Likewise, receipt of a fourth compute context while workloads from first, second, and third compute context streamers are actively executed can cause allocation of compute contexts according to a workload distribution scheme among quadrants for four compute context streamers.

In the event a quadrant has completed execution of a workload and a compute context streamer assigned to the quadrant provides no additional workloads, the quadrant can be available for allocation according to the workload distribution scheme based on the number of active contexts from compute context streamer(s). For example, two context streamers have active workloads and a first compute context streamer is assigned to first and second quadrants and a second compute context streamer is assigned to third and fourth quadrants. In the event the first compute context streamer has no additional workloads (e.g., threads, commands, or contexts), the workload distribution scheme can cause workloads associated with the second compute context streamer to be executed on first, second, third and fourth quadrants after workloads associated with the first compute context streamer have completed execution on the first and second quadrants.

Figure 15:
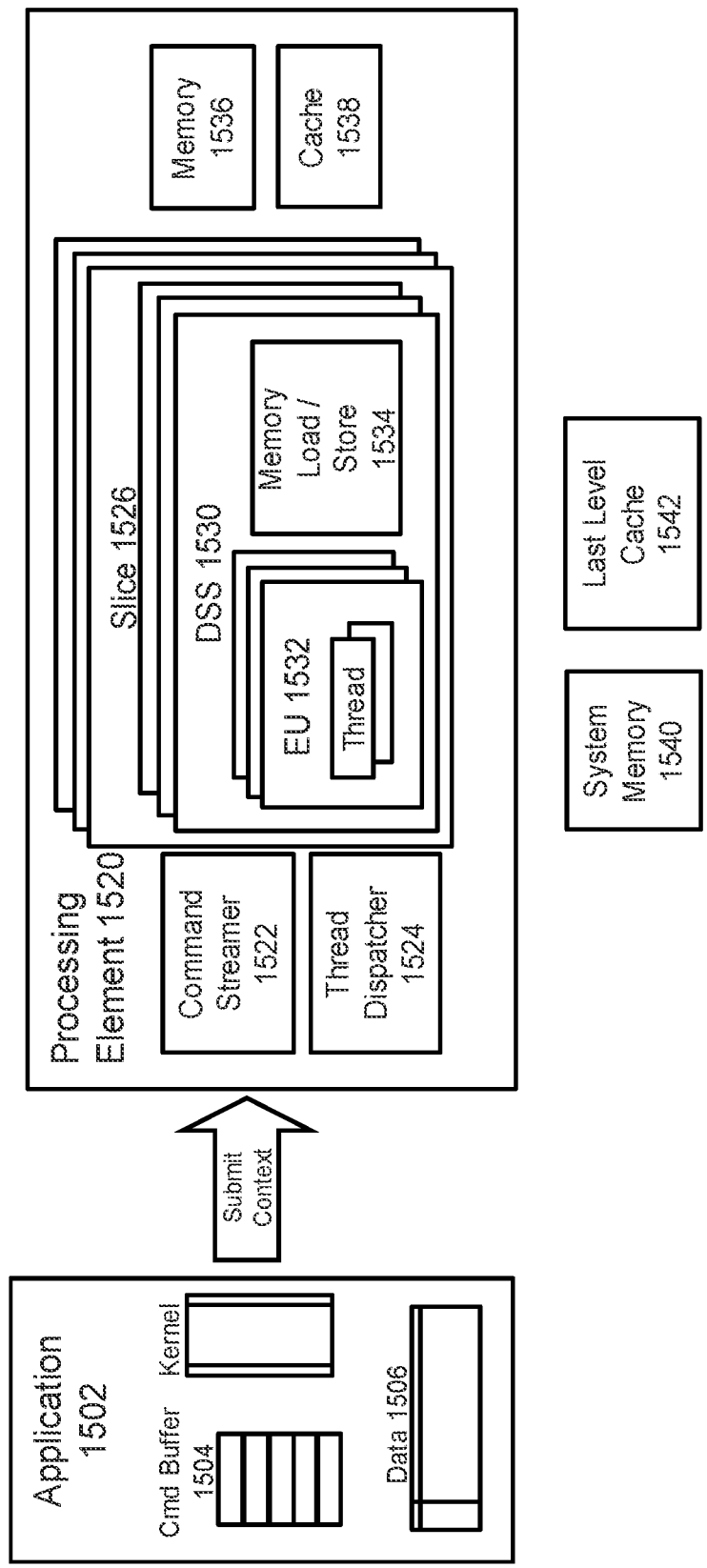
FIG. 15 depicts an example environment.

FIG. 15 depicts an example environment. Application 1502 can generate commands for processing associated data for storage in Command (Cmd) Buffer 1504 and data buffer 1506. The commands can also include references to data stored in memory, such as but not limited to vertex and geometry data and/or image data and memory objects. Processing element 1520 can be one or more of: a rendering engine, execution unit, graphics processing unit, central processing unit, accelerator, field programmable gate array, and so forth. Command streamer 1522 can provide a stream of commands for example from an application. Thread dispatcher 1524 can dispatch threads on execution units (EUs) 1532 for execution. In this example, processing element 1520 can include one or more dual subslice (DSS) 1530 with one or more execution units (EUs) 1532. An EU 1532 can execute a portion of a command via execution of a thread and its associated kernel. Processing element can use a memory 1536 and cache 1538 for execution of threads and storing results. Data and results can be copied to system memory 1540 or last level cache 1542 associated with one or more cores or CPUs.

Figure 16:
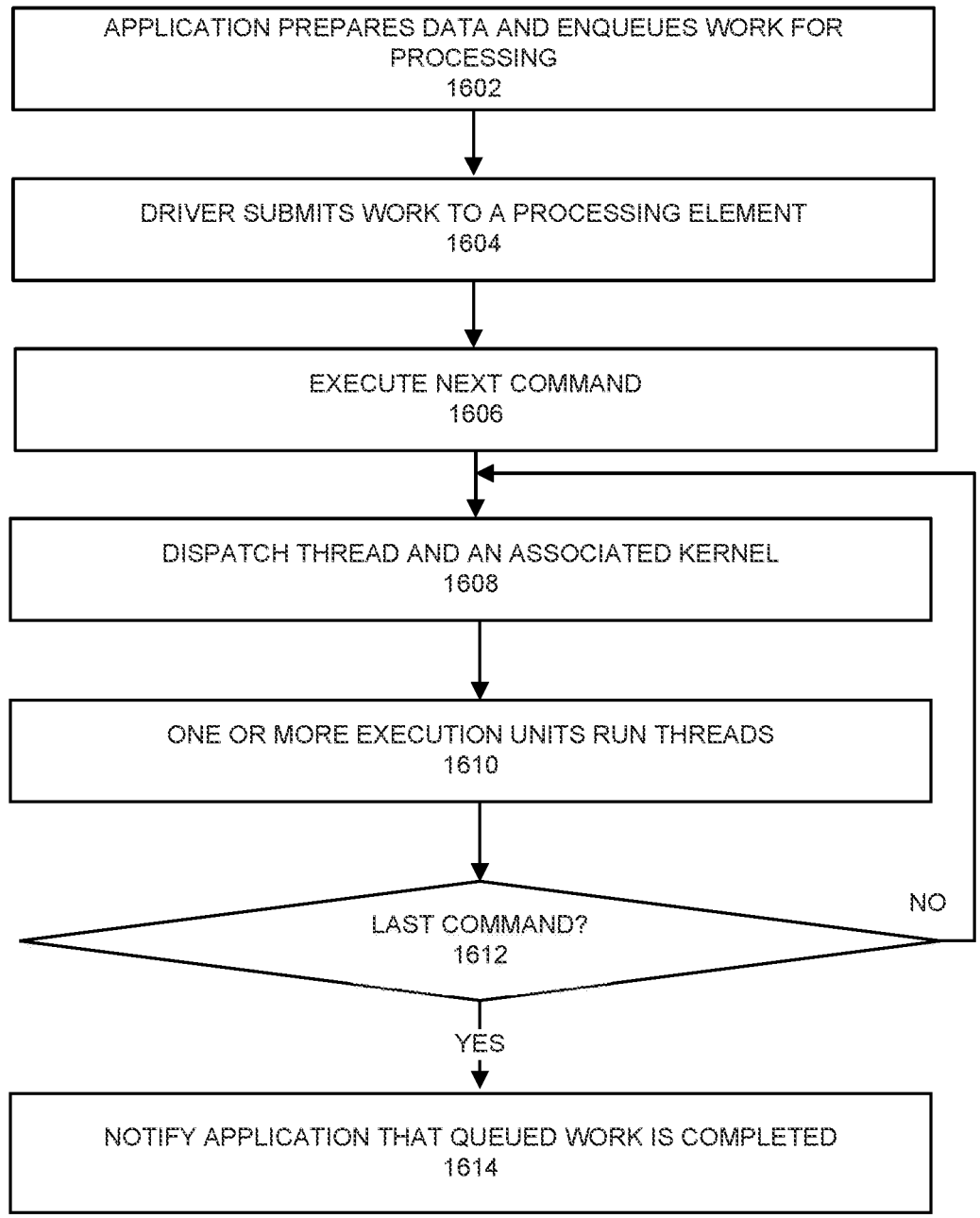
FIG. 16 depicts an example process.

FIG. 16 depicts an example process. The process can be performed using an environment described with respect to FIG. 15, although other environments can be used such as that described with respect to FIG. 17A or another similar or different computing environment. At 1602, an application prepares data and enqueues work (e.g., command, kernel, and context) for execution by a processing element. At 1604, a driver for a processing element can submit the work to the processing element. At 1606, the processing element executes a next command At 1608, a thread and associated kernel are dispatched. For example, a hardware dispatch engine (e.g., thread dispatch engine) can dispatch threads. At 1610, one or more execution units run any ready-to-run thread. For example, a ready-to-run thread can have an associated kernel for computes and loads/stores. An EU switches to a next thread on a memory fetch or register stalls, among others. When a thread terminates, the EU stores results and states to memory and accepts another thread for execution. At 1612, a determination is made as to whether a last command is reached for submitted work. If a last command is not reached for submitted work, then 1608 follows. If a last command is reached for submitted work, then 1614 follows. At 1614, the application is notified that queued work is completed.

Figure 17A:
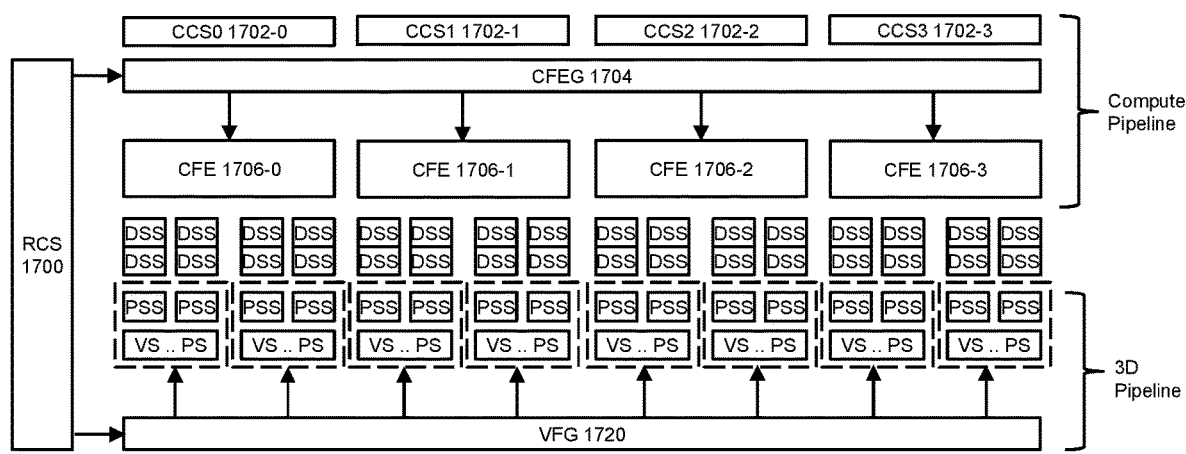
FIG. 17A depicts an example graphics processing unit system.

FIG. 17A depicts an example graphics processing unit system. In some examples, a global compute front end (CFEG) 1704 can receive commands from render command streamer (RCS) 1706 and asynchronous compute context streamers (CCS) 1702-0 to 1702-3, although different numbers of RCS and CCS can be supported. CFEG 1704 can use, provide or act as a command or thread dispatch engine. A compute command streamer (e.g., CCS0 1702-0 to CCS3 1702-3) can receive and interpret an asynchronous compute context. Incidentally, compute contexts can be provided through a dispatch portion using an MMIO address by an application for example. A MMIO address can be associated with a CCS and a software driver and microcontroller can route requests to a specific CCS or any CCS. CCS 1702-0 to 1702-3 can provide compute contexts to CFEG 1704 for distribution to one or more CFE 1706-0 to 1706-3. For example, a compute context can define data, variables, conditions, kernels, commands, source and destination memory locations, and other information or commands used to perform operations on data. A CCS allows a programmer or application to select the type of computation to perform as opposed to invoking multiple stage processing. Examples of applications using compute command streamers include matrix applications (e.g., machine learning), physical modelling in games, high performance compute engines (e.g., chemical reactions). CFE 1706-0 to 1706-3 can generate thread(s) from compute contexts using a single compute stage.

CFEG 1704 can use a mapping table to select which of CFE 1706-0 to 1706-3 to receive contexts, workloads, threads, or commands from one or more CCS0-CCS3 or RCS 1700. A command, workload, or thread can include or generate multiple commands, workloads, or threads. For example, the mapping table can be implemented as a state machine or programmable table that specifies work allocation from one or more of CCS0-CCS3 to a compute front end (CFE) 1706-0 to 1706-3. An example mapping table is described with respect to FIG. 20, although other schemes can be used. Based on whether a CFE 1706-0 to 1706-3 is processing a workload associated with a context and a source of a workload, CFEG 1704 can allocate the workload or thread to a specific CFE according to the mapping table. CFEG 1704 can provide, use or act as a thread scheduler to allocate threads for execution. If the CFE specified by the mapping table to handle a workload from CCS is available or inactive, CFEG 1704 can send work to the specified CFE. If the CFE specified by the mapping table to handle a workload from a CCS is active handling work for the same CFE, CFEG 1704 can wait for the CFE to complete work or wait for another CFE (mapped to receive commands from the CCS) that is free and send the work to that CFE. CFEG 1704 can send work to a CFE that is available for processing and does not need to stop active workloads on a particular CFE. After state and data are available from EUs associated with a CFE, that information can be copied and the EUs associated with a CFE can be available to perform work. Accordingly, CFEG 1704 can dynamically allocate one or more DSSs to execute a workload from a CCS or RCS and manage transition from inactive state to performance of a workload allocated by the mapping table, completion of the workload, to commencement of a workload from the same or different CCS according to the mapping table.

CFEG 1704 can dispatch workloads from RCS 1700 to a least loaded DSS but CCS workloads can be allocated using a mapping table and can only be sent to a permitted DSS (according to the mapping table). For example, CFEG 1704 can receive inputs from CCS0 1702-0 to CCS3 1702-3 and inputs from RCS 1700 and distribute work from CCS0 1702-0 to CCS3 1702-3 to CFE 1706-0 to 1706-3 based on a workload mapping table. CFEG 1704 can perform dynamic load balance of workloads sent to a CFE from a CCS. In some embodiments, CFEG 1704 can break work into smaller pieces. For example, for a 1000 threads workload, 10 threads can be allocated to a CFE in a batch until all threads are completed.

CFE 1706-0 to 1706-3 can allocate (e.g., dispatch) workloads to respective quadrants 0 to 3 and each quadrant can be associated with one or more dual subslices (DSSs) available for execution of threads. CFE 1706-0 to 1706-3 can perform load balancing on DSSs. A DSS can run workloads or threads (e.g., kernels and/or code) provided from a CCS0 1702-0 to CCS3 1702-3 or RCS 1700. A DSS can be implemented as an execution unit, processor, core, fixed function device, field programmable gate array (FPGA), programmable logic control (PLC), application specific integrated circuit (ASIC), and so forth. In some embodiments, DSSs can provide homogenous compute capabilities. In some examples, workloads from RCS 1700 can run on any compute assets (e.g., DSS) in the system, but workloads from a CCS on the other hand can be allocated to run on specific quadrants based on the activity of the other CCS contexts and the mapping table. In some examples, a DSS can only accept workloads from 1 of 4 CCS at a time but any DSS can receive workloads from RCS 1700. In some examples, every thread executed by a DSS has an associated identifier to a context so a DSS thread can track an associated context for a thread.

Restricting CCS to allocating workloads to specific quadrants can limit an amount of state stored for use by a quadrant of DSS and limit the amount of memory used to store context so that workloads allocated by the CCS can share state or context. State for workloads from an RCS can be shared among multiple quadrants.

RCS 1700 can run 3D graphics processing commands or compute commands and dispatch 3D render compute contexts for execution by one or more dual subslices (DSS) via CFEG 1704 or vertex fetch global unit (VFG) 1720. VFG 1720 can perform load balancing of vertex processing. RCS 1700 can generate and dispatch threads to a multi-stage fixed 3D graphics pipeline to move computation through the 3D pipeline, in sequence. RCS 1700 can setup states of pipeline (e.g., 3D render context) based on a draw command where a pipeline can include one or more of: a vertex shader, hull shader, geometry shader, pixel shader, hashing pixel shaders, tessellation, and so forth. In some examples, DSS can accept workloads for use in OpenGL or DirectX compliant graphics pipelines, among others.

Various embodiments can use CFEG 1704 to manage workload distributions to DSSs without software synchronization such as pipe control and flushes that could limit performance.

Figure 17B:
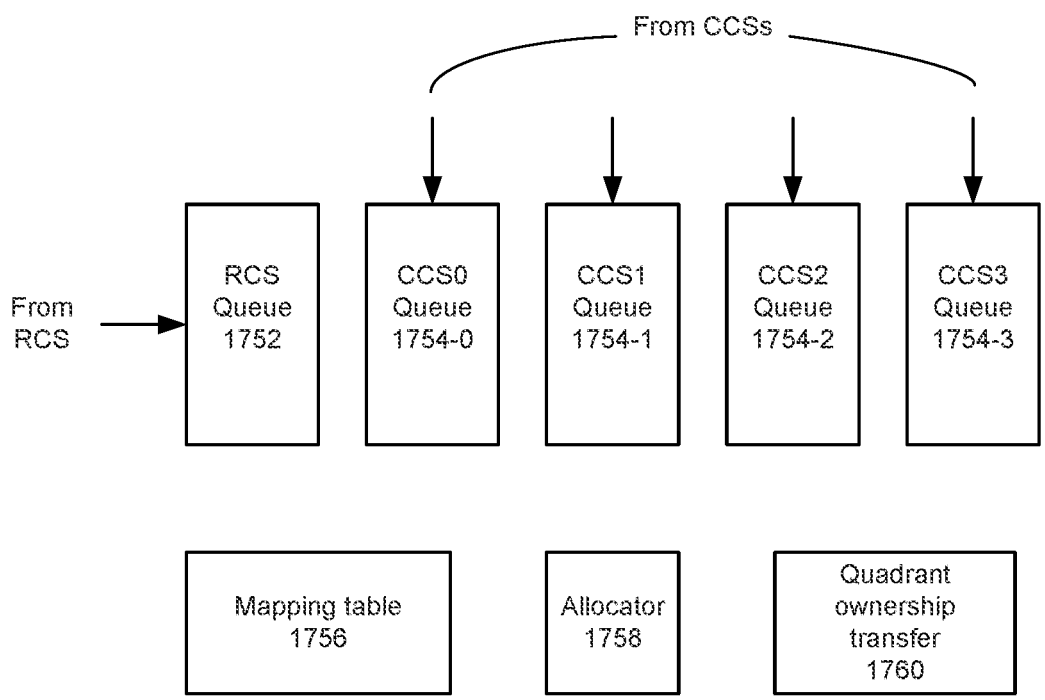
FIG. 17B depicts an example global compute front end.

FIG. 17B depicts an example global compute front end. In this example, RCS queue 1752 can receive and enqueue commands from an RCS, although other numbers of queues can be used. CCS0 queue 1754-0 to CCS3 queue 1754-3 can receive and enqueue commands from respective CCS0 to CCS3, although other numbers of queues can be used. Allocator 1758 can determine which quadrant or computing resource to allocate to perform a command based on the compute context streamer(s) that have active commands for performance. Mapping table 1756 can indicate which quadrant or computing resource to allocate to perform a command from a compute context streamer. An example mapping table is described for example with respect to FIG. 20. Quadrant ownership transfer device 1760 can manage ownership change of a quadrant or computing resource when a compute context streamer is to use a quadrant or computing resource after a different compute context streamer uses the same quadrant or computing resource. For example, quadrant ownership transfer device 1760 can flush the write data buffer of the quadrant(s) to cache (e.g., level 3 cache), invalidate the state and constant caches, and/or propagate the state values to the shared function units (e.g., DSS units). The state values can be pointers to the location of the surface_state, binding table, and so forth.

Figure 18:
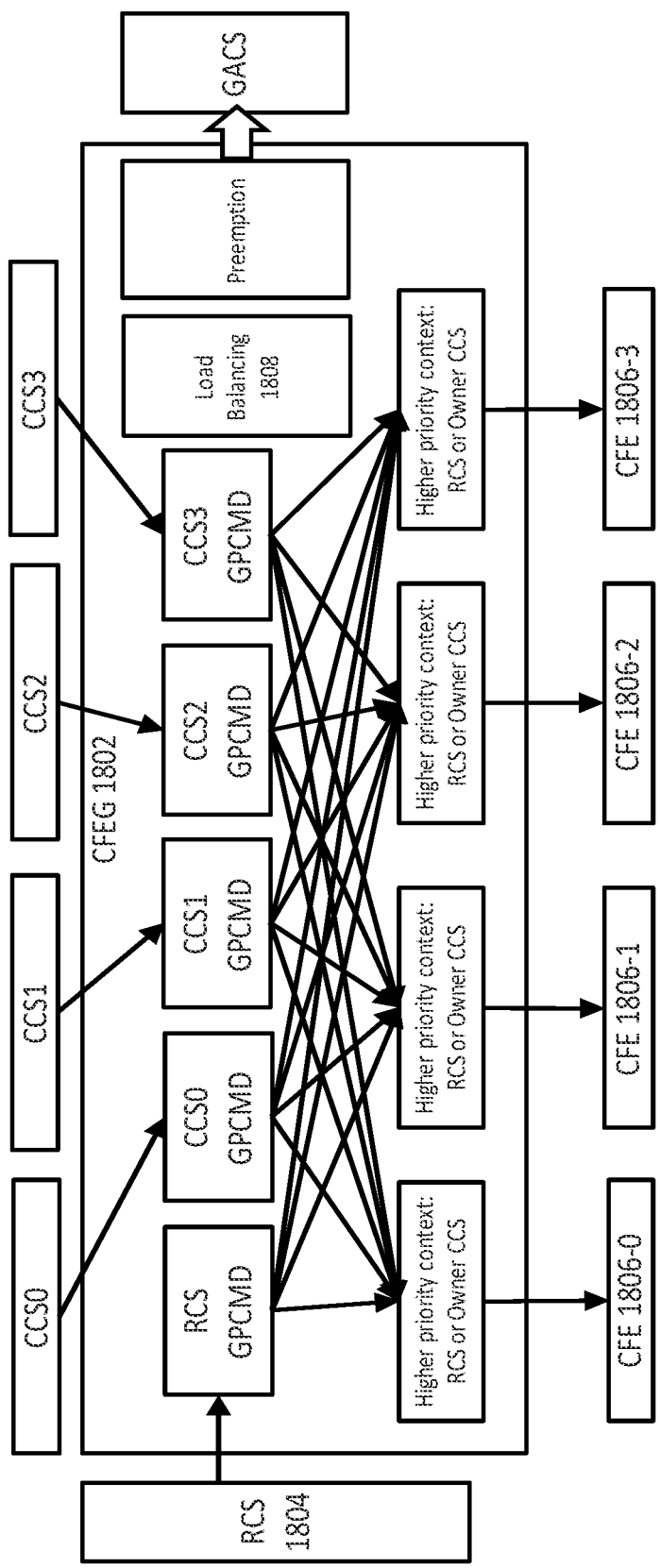
FIG. 18 depicts an example of distribution of work.

FIG. 18 depicts an example of distribution of work. In this example, CFEG 1802 distributes compute work from CCS0 to CCS3 and RCS 1804 to one or more of CFE 1806-0 to 1806-3. For a CCS (CCS0 to CCS3), a general purpose command streamer (GPCMD) tracks commands requested for execution. GPCMD executes a COMPUTE_WALKER command to cause execution of a kernel over one or more thread group dispatches. For example, based on a mapping table of CCS to CFE (and associated quadrant), a GPCMD can dispatch batches of 1 to 16 thread groups to a CFE every cycle. CFEG 1802 can provide prioritization of context forwarding among contexts from CCSs and RCS. A CFE can support active contexts from an RCS and one CCS. In some examples, a higher priority context from an RCS or CCS can be provided for dispatch to a CFE and its associated quadrant.

Load balancing unit 1808 manages the transition of CFE ownership from one context to another. Load balancing unit 1808 can wait for a context's thread dispatches to finish and then set up the state for the new owning context.

In some embodiments, a state from any preempted GPCMD is saved in context image in a common interface to a memory unit, e.g., global addressing unit for command streamers (GACS).

Figure 19:
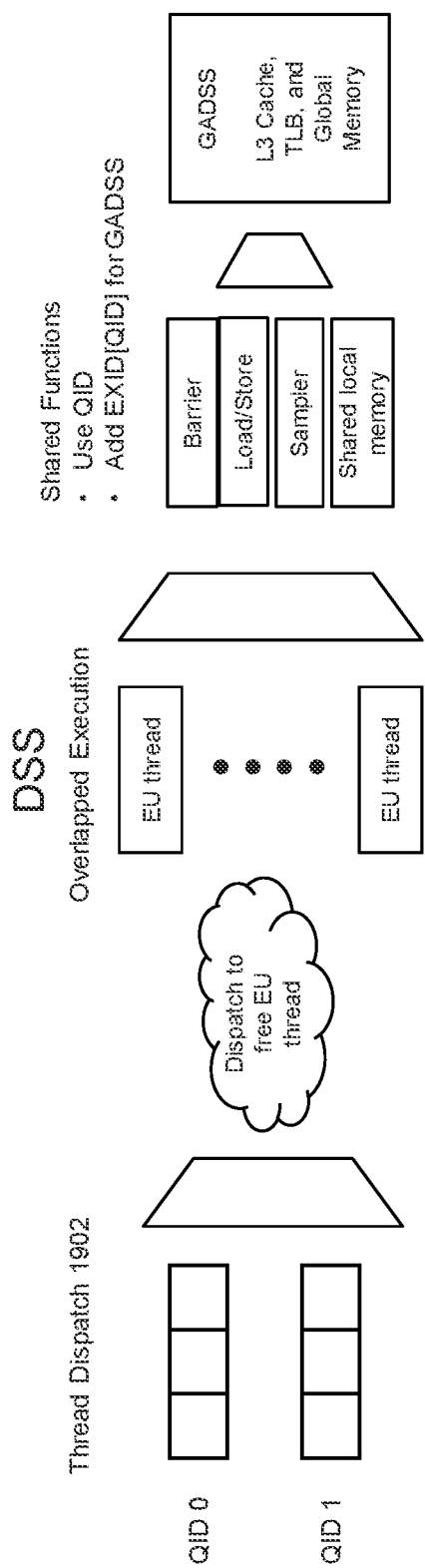
FIG. 19 depicts an example use of thread execution.

FIG. 19 depicts an example of context executions. Threads associated with RCS and CCS context dispatches can be provided to a DSS using a limited bus resource. RCS and CCS thread dispatches can arrive at a DSS in parallel. Virtual channels can be provided to every DSS whereby QID0 is used to identify threads from RCS and QID1 is used to identify threads from a CCS. For a DSS, a single CCS can dispatch a thread at a time. Running contexts can be submitted to a command streamer, where a command streamer is assigned a QID. The 3D command stream is assigned a QID of QID0 whereas compute command streamers are assigned a QID of QID1. Thread dispatch 1902 can dispatch a thread with an associated QID (e.g., QID0 or QID1). A command streamer's active page table is assigned a unique EXID and the EXID tag is used with every memory address for memory caches and page table translations. In some embodiments, a GPU supports one 3D command streamer simultaneous with zero to four active compute command streamers. The dispatched thread can be a request to perform a workload, thread execution, or graphics processing operation.

Thread dispatch 1902 allocates a free thread, its barrier, and shared local memory (SLM). On thread allocation, thread dispatch 1902 clears general purpose register file (GRF), the thread's barrier, and SLM. In this example, caches associated with threads having QID0 and QID1 are flushed when a QID context changes. A dispatched thread can execute on an execution unit (EU).

A DSS partition of a GPU that includes one or more execution units (EUs) can simultaneously run two contexts: one QID0 and one QID1. Each executed thread has its own QID, registers (e.g., GRF), shared local memory (SLM) base/limit (e.g., memory resource used by DSS to read/write memory). Multiple EUs can execute different threads in parallel. Shared function caches are tagged using a QID. Shared local memory accesses are bound-checked based on a per-thread limit.

In order to attempt to provide for data isolation among threads, a DSS shared resource can use the QID tag to isolate two different compute contexts, both QID1, running separately on the same DSS (or portion thereof) only after the previous QID1's old data has been cleared. Global addressing for DSS units (GADSS) provides for arbitration among memory requesters inside DSS to select memory request and issue memory request and route content to a requester.

EXID[QID] can indicate a memory address entry location for a context (e.g., inside level 3 cache and page table translation).

Figure 20:
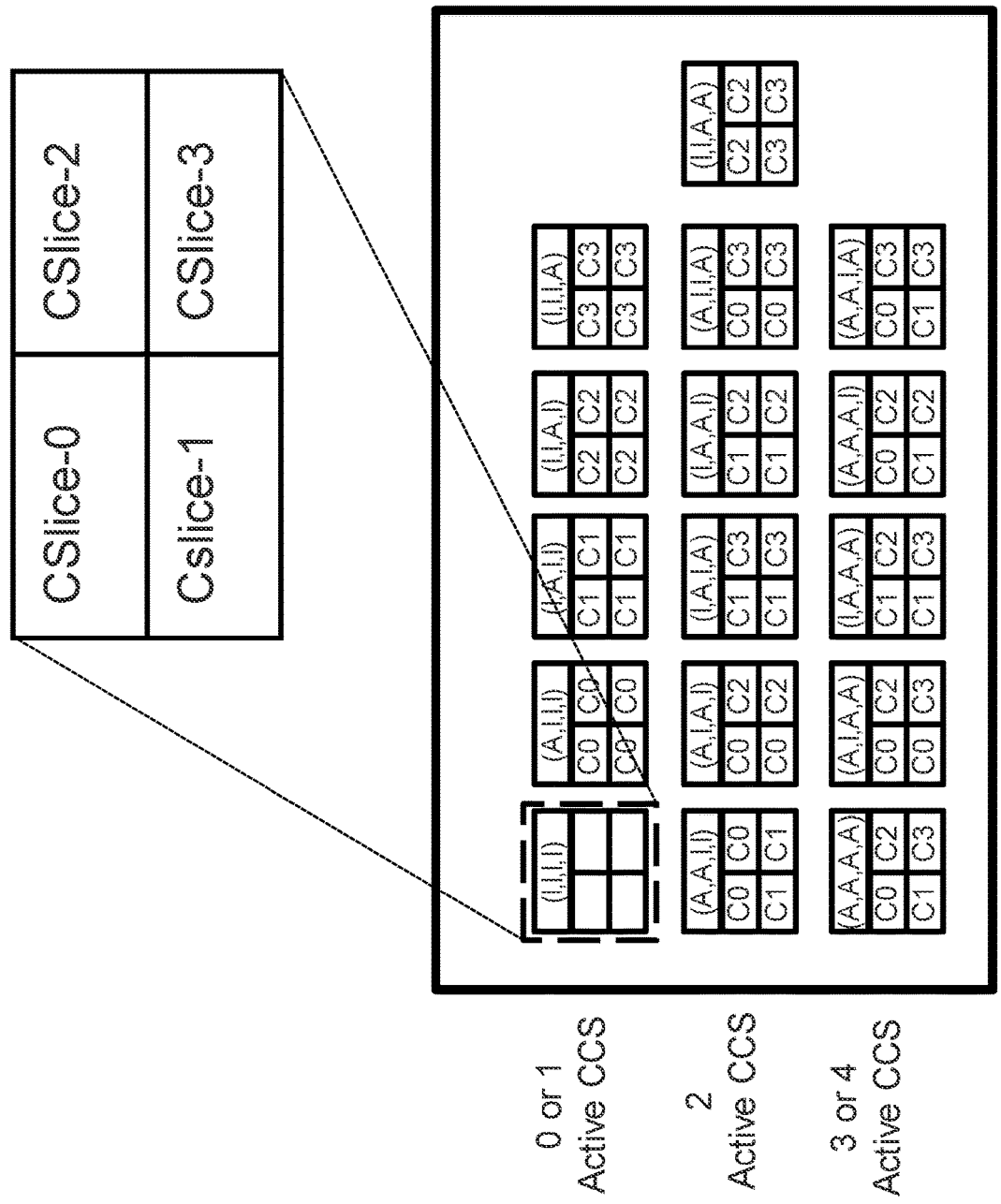
FIG. 20 depicts an example resource allocation scheme.

FIG. 20 depicts an example resource allocation scheme. Various embodiments can use a workload mapping table to map a current active state tuple to a CFE cluster (e.g., C-Slice or CSlice) as allocated to a particular compute context streamer (CCS). A CCS can be considered Idle (I) or Active (A). The "A" label means that a workload from a CCS is actively executing on a quadrant and the "I" label means that the CCS is IDLE (e.g., a quadrant is not executing a workload). A mapping table defines an "active state" tuple for CCS0, CCS1, CCS2, and CCS3 (shown as respective C0, C1, C2, and C3) for 16 cases, although other numbers of cases can be handled. When the active state tuple changes, a global compute front end (CFEG) slice allocator shifts C-slice (e.g., quadrant) ownership. The priority of a CCS context can be ignored when re-balancing slice ownership.

Based on the mapping table system with 4 C-slices, each C-slice is mapped to perform threads from a particular CCS. Before any context is submitted for execution, all C-slice quadrants are in an inactive state. For a single CCS providing contexts for work, all C-slices are allocated for processing contexts from the single CCS. The row entitled "0 or 1 Active CCS" provides an example of allocation of a C-Slice for processing a context from a single CCS. A C-Slice can include one or more DSS. For example, contexts from CCS0 can be allocated to all C-Slices (shown as C0), contexts from CCS1 can be allocated to all C-Slices (shown as C1), and so forth.

The row entitled "2 Active CCS" provides an example of allocation of C-Slices for processing contexts from a two CCSs. For example, contexts from CCS0 and CCS1 are allocated for processing by C-Slices whereby half of a CFE cluster executes contexts from CCS0 (e.g., Cslice-0 and Cslice-2) and another, different, half executes contexts from CCS1 (e.g., Cslice-1 and Cslice-3). A more specific example is 8 DSSs are allocated to a CFE cluster and 4 DSSs are allocated for processing contexts from CCS0 and 4 DSSs are allocated for processing contexts from CCS1.

The row entitled "3 or 4 Active CCS" provides an example of allocation of C-Slices for processing a context from three or four CCSs. For example, contexts from CCS0, CCS1, and CCS2 are allocated for processing by C-Slices whereby a quarter of a CFE cluster executes contexts from CCS0 (e.g., Cslice-0), a quarter of a CFE cluster executes contexts from CCS1 (e.g., Cslice-1), and a half of a CFE cluster executes contexts from CCS2 (e.g., Cslice-2 and Cslice-3). A more specific example is 8 DSSs are allocated to a CFE cluster and 2 DSSs are allocated for processing contexts from CCS0, 2 DSSs are allocated for processing contexts from CCS1, and 4 DSSs are allocated for processing contexts from CCS2.

Note that the ownership mapping tables can be adjusted so that any DSSs can be selected for processing a context from a CCS. Note also that for allocations of 3 Active CCSs, any CCS can be chosen for allocation of 50% of CFE cluster processing resources. In some cases, if a higher number of workloads arrives from a CCS, then the CCS can be allocated 50% of processing resources and the other two CCSs are allocated 25% of processing resources each.

For example, contexts from CCS0, CCS1, CCS2, and CCS3 are allocated for processing by C-Slices whereby a quarter of a CFE cluster executes contexts from CCS0 (e.g., Cslice-0), a quarter of a CFE cluster executes contexts from CCS1 (e.g., Cslice-1), a quarter of a CFE cluster executes contexts from CCS2 (e.g., Cslice-2), and a quarter of a CFE cluster executes contexts from CCS3 (e.g., Cslice-3). A more specific example is 8 DSSs are allocated to a CFE cluster and 2 DSSs are allocated for processing contexts from CCS0, 2 DSSs are allocated for processing contexts from CCS1, 2 DSSs are allocated for processing contexts from CCS2, and 2 DSSs are allocated for processing contexts from CCS3. Note that the ownership mapping tables can be adjusted so that any DSSs can be selected for processing a context from a CCS.

Next, an example description is provided of a manner transferring between an active CCS state or to a non-active CCS state whereby no context or workload from a CCS is executing using a CFE cluster (e.g., quadrant). When a graphics processing engine changes from one active CCS (e.g., CCS0 active) to two active CCSs (e.g., CCS0 and CCS1), some of the CSlices that were running threads from CCS0 are allocated to run threads from CCS1. For example, when CCS0 is the only active CCS, C-Slice0 to C-Slice3 are allocated for running threads from CCS0. Transition to running workloads from CCS0 could involve swapping of CSlice-1 and CSlice-3 from use by CCS0 to use by CCS1 after work executed by CSlice-1 and CSlice-3 completes. Similarly, when going from two active CCS (CCS0 and CCS1) to one active (CCS0), workloads are distributed from the CCS0 to all C-slices.

CCS0 to CCS3 (represented by C0-C3) can use different MMIO ports for context submission (e.g., work submissions). In the example, where C0 is running contexts from CCS0 and a context from CCS1 is submitted through a MMIO port, the system can wait for CSlices-1 and 3 to finish, then allow dispatch of a context from CCS1 to bottom quadrants (CSlices-1 and 3). In addition, work dispatched from CCS0 can be provided to CSlice-0 or CSlice-2. After CSlice-1 and 3 finish their workload and no more contexts are available from CCS1, then the four quadrants (e.g., CSlices-0 to 3) can be allocated to handle work from CCS0. After finishing work from CCS0, then all quadrants can become inactive.

Figure 21:
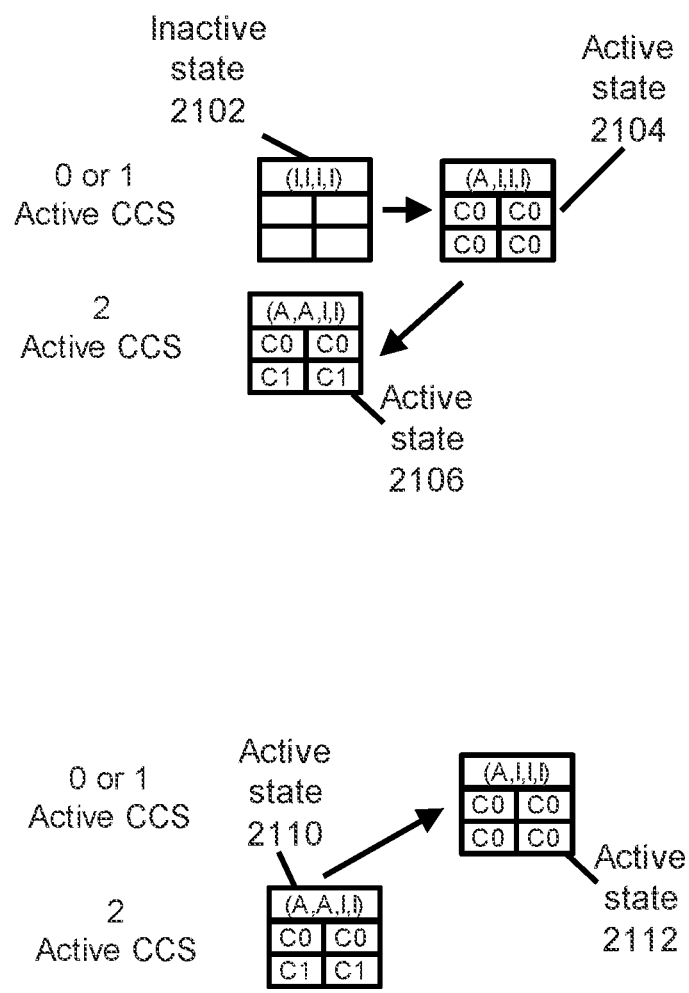
FIG. 21 depicts an example of movement between states.

FIG. 21 depicts an example of movement between states. For example, in inactive state 2102, all CSlices are idle. After a CCS0 dispatches one or more threads that are mapped to run on all 4 Cslices (Cslice1-Cslice3), the state changes to state 2104. A software application submits a compute walker command using CCS1. Based on one example mapping table, the command from CCS1 can be run on Cslice1 and Cslice3. CFEG stops from dispatching threads from CCS0 to Cslice1 and Cslice3. CFEG waits for all running threads from CCS0 to complete on Cslice1 and Cslice3 but allows CCS0 to continues to dispatch threads on Cslice0 and Cslice2. CFEG flushes the write data buffer of the Cslice1 and Cslice 3 to cache (e.g., level 3 cache) to ensure that the write data is globally observable and accessible. CFEG invalidates the state and constant caches of CCS0. Before running threads of CCS1 on Cslice1 and Cslice3, the state values are propagated to the shared function units in Cslice1 and Cslice3 (e.g., DSS units). The state values can be pointers to the location of the surface_state, binding table, and so forth. After propagating the state values, CFEG starts dispatching CCS1 threads to Cslice1 and Cslice3 and the state changes to state 2106.

The following example describes a case of state 2110 where commands from CCS0 are running on Cslice0 and Cslice2 whereas commands from CCS1 are running on Cslice1 and Cslice3. Commands from CCS1 have completed or are preempted and Cslice1 and Cslice3 are free.

CFEG prepares the Cslice1 and Cslice3 to start running threads for CCS0 so that Cslice0-Cslice3 run threads for CCS0 at state 2112.

Note that a slice can be preempted by another CCS if an application indicates preemption is to be applied. For example, preemption can include allowing threads on a slice to complete, saving state and data, and running threads associated with the command that invokes preemption. A CFEG can stop dispatches to the preempted slice and wait for dispatched threads to complete. Threads that have not been dispatched can be resumed on the same slice (after preemptive threads complete) or using another slice.

Figure 22:
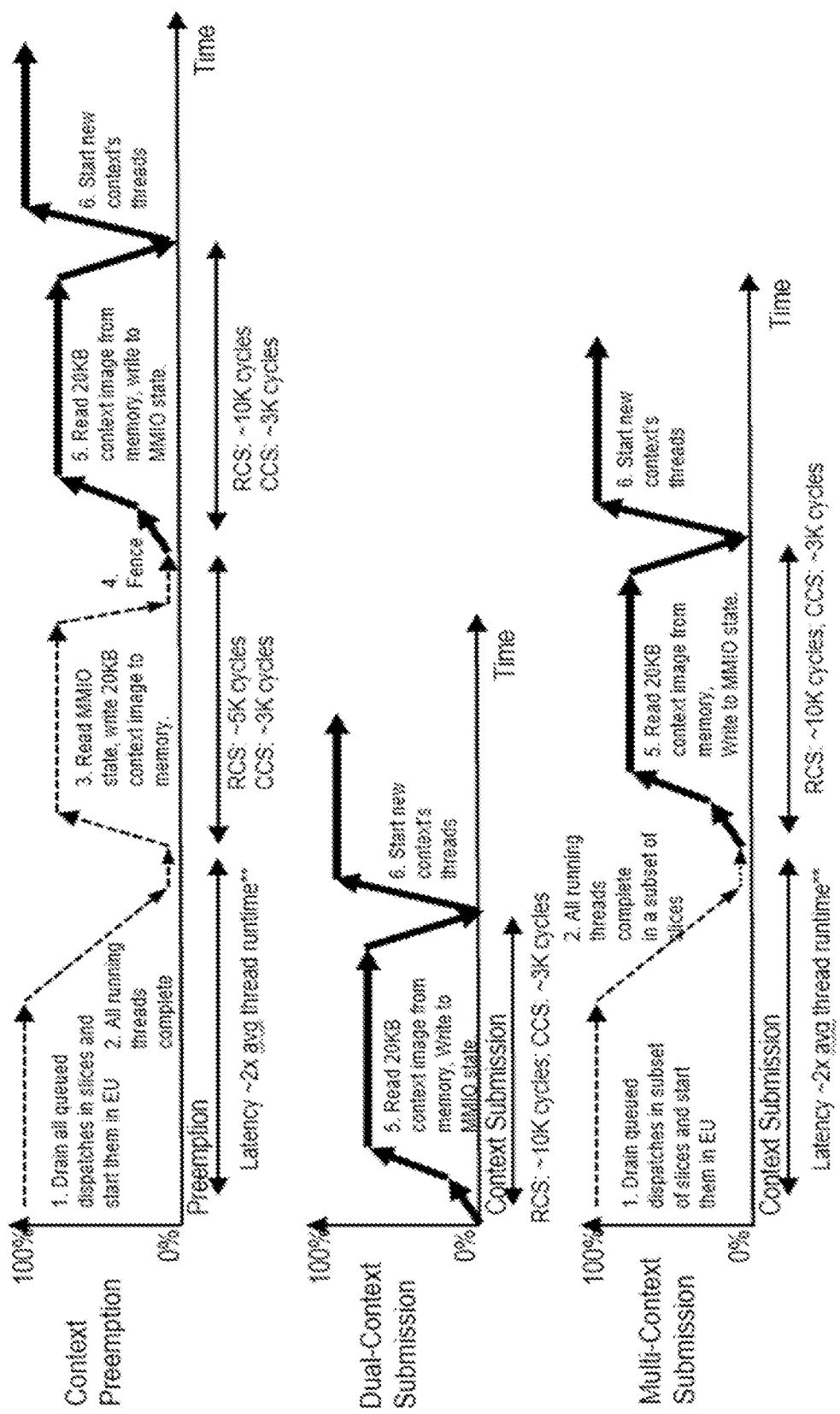
FIG. 22 depicts an example of time taken for processing contexts.

FIG. 22 depicts an example of time taken for processing contexts. The vertical axis represents EU utilization and the horizontal access represents time. The examples show time taken to complete processing a submitted context for three scenarios: context preemption, dual-context submission, and multi-context submission. In the example of context preemption, an actively processed context is replaced. Dual-context submission allows for contexts to be submitted to execution units without replacing an active context. Multi-context submission allows for an active context to complete and the EU that processed the active context to process another context. As is shown, dual-context submission and multi-context submission can allow for submitted contexts to commence execution sooner than a case of context preemption.

Figure 23:
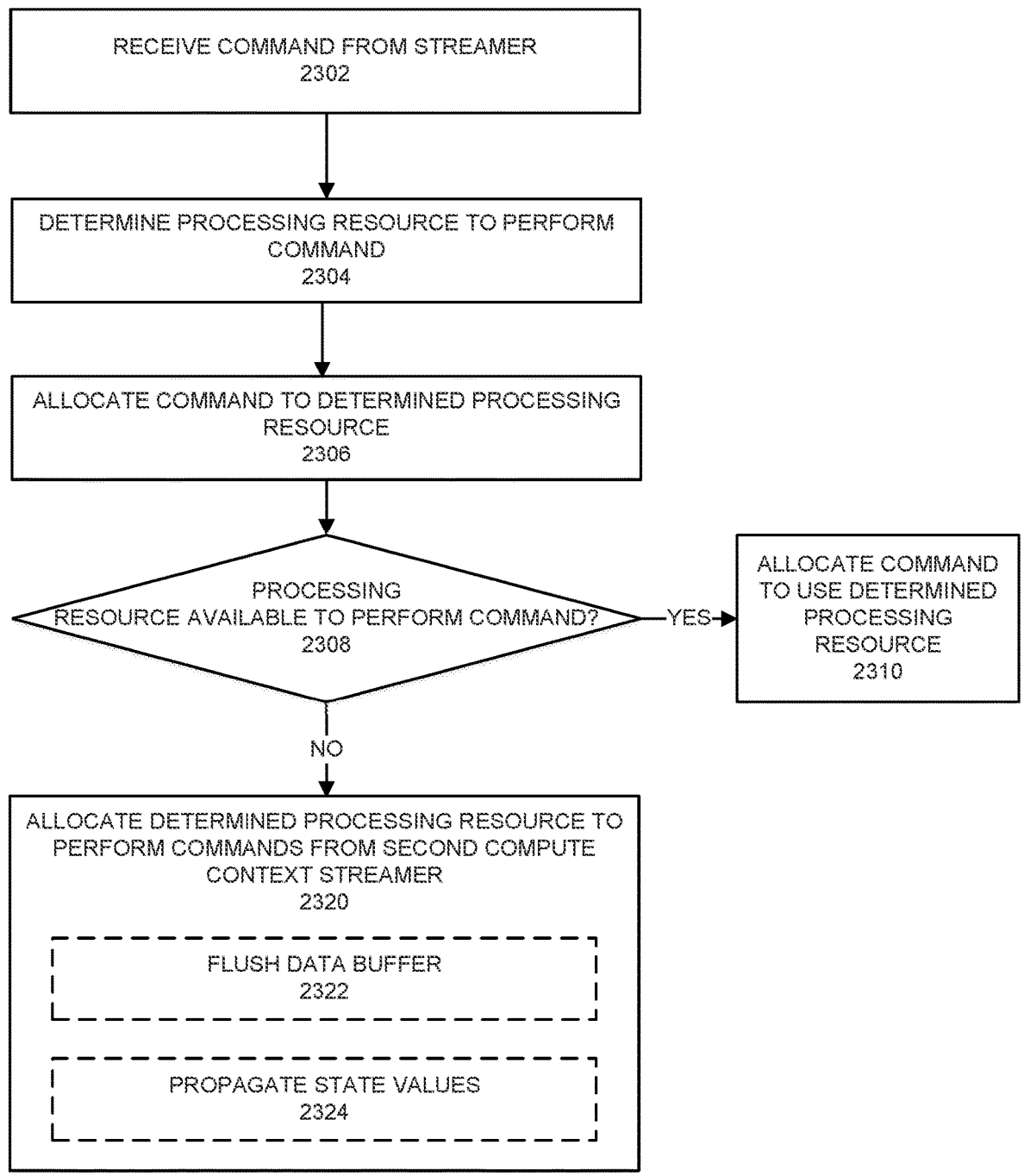
FIG. 23 depicts an example process.

FIG. 23 depicts an example process. At 2302, a command from a streamer is received. The command can be received from one of multiple compute context streamers. Compute context streamers can receive contexts from one or more applications. The command can be based on a compute context or a render context. For example, a compute context can define data, variables, conditions, kernels, commands, source and destination memory locations, and other information or commands used to perform operations on data. At 2304, a determination can be made as to which processing resource to use to perform the command For example, a mapping table can be used to allocate a command to a processing resource based on a source compute context streamer and which compute context streamer has an actively executed command For example, a computing resource can include multiple processing resources and commands from a particular compute context streamer can be allocated for execution by a particular processing resource. A computing resource can be a GPU, CPU, GPGPU. A processing resource can include one or more of: a DSS, execution unit, processor, core, fixed function device, field programmable gate array (FPGA), programmable logic control (PLC), application specific integrated circuit (ASIC), and so forth. At 2306, the command is allocated to a determined processing resource for execution.

At 2308, a determination can be made as to whether the determined processing resource to perform the command is available to perform the command For example, the determined processing resource is available to perform the command if the processing resource is allocated to perform commands from the same compute context streamer and 2310 follows. For example, the determined processing resource is not available to perform the command if the determined processing resource is performing another command from a different compute context streamer than that which provided the command and 2320 follows.

At 2310, the command is allocated to use the determined processing resource. A command can be represented using one or more threads. For example, if there is a queue for one or more threads associated with a command, then the one or more threads are added to the queue and can be performed in turn.

At 2320, the determined processing resource is allocated as permitted to perform commands from a second compute context streamer. The second compute context streamer can be a compute context streamer that provided the command at 2302. One or more threads can represent a command and be provided for execution. At 2322, the write data buffer of the processing resource are flushed to cache (e.g., level 3 cache) to provide for the write data as observable and accessible and the state and constant caches of the former compute context streamer are invalidated. In addition, at 2324, state values of the second compute context streamer are propagated to shared function units of the determined processing resource. Enqueued commands can be moved and allocated to be performed by another processing resource.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

What is claimed is:

1. An apparatus comprising:
    a graphics processing unit (GPU) including a plurality of processing resources and circuitry to dispatch at least one command for execution by the GPU, wherein the circuitry is to:
        based on a configuration, limit execution of a first command of the at least one command to one or more particular processing resources of the GPU based on a source of the first command, wherein the configuration is to indicate one or more particular processing resources of the GPU permitted to execute commands from one or more particular sources and wherein based on utilization of a second configuration, the circuitry is to change one or more particular processing resources of the GPU permitted to perform operations for the source of the first command.

2. The apparatus of claim 1, wherein in response to receipt of a second command from a second source while the first command is executing, the circuitry to dispatch is to:
    based on the configuration indicating that the second source is permitted to execute a command on the one or more particular processing resources that execute the first command:
    permit the first command to complete execution on the one or more particular processing resources and
    allocate the second command for execution on one or more particular processing resources that previously executed the first command.

3. The apparatus of claim 2, wherein the circuitry to dispatch is to:
    after completion of the first command, flush a write data buffer to a cache and invalidate state and constant caches associated with the one or more particular processing resources that executed the first command.

4. The apparatus of claim 2, wherein the circuitry to dispatch is to:
    in response to detection of completion of the second command and an unexecuted command from the source of the first command, allocate one or more of the processing resources formerly allocated to execute the second command to perform the unexecuted command from the second source.

5. The apparatus of claim 2, wherein the first command is associated with a compute context or a render context and based on completion of execution of the first command, permit access to the compute context or the render context for use by the second command.

6. The apparatus of claim 1, wherein the circuitry to dispatch is to:
    in response to receipt of a third command associated with a third source, allocate one or more of the processing resources to perform the third command based on the configuration.

7. The apparatus of claim 1, wherein comprising a memory device communicatively coupled to the circuitry to dispatch at least one command for execution by the GPU, wherein the memory device is to store the configuration.

8. The apparatus of claim 1, comprising one or more of:
    a general purpose graphics processing unit or a central processing unit, wherein the general purpose graphics processing unit or the central processing unit is to execute a process that is a source of the first command.

9. A method comprising:
dispatching a first command for execution by a first set of one or more processing resources of a graphics processing unit (GPU) based on a first configuration that indicates the first set of one or more particular processing resources of the GPU that are permitted to execute commands from one or more particular sources and based on a second configuration that indicates a second set of one or more particular processing resources of the GPU permitted to perform operations for the one or more particular sources of the first command, dispatching a second command to the second set of one or more particular processing resources of the GPU, wherein the second set of one or more particular processing resources of the GPU is at least partially different than the first set of one or more particular processing resources of the GPU, and wherein the second command is provided by the one or more particular sources of the first command.

10. The method of claim 9, wherein the first command is associated with a first source and comprising:
in response to receipt of a third command from a second source while the first command is executing:
based on the first configuration indicating that the second source is permitted to execute a command on the one or more particular processing resources that execute the first command:
permitting the first command to complete execution on the first set of one or more particular processing resources and
allocating the third command for execution on one or more particular processing resources that previously executed the first command.

11. The method of claim 10, comprising:
after completion of the first command, flushing a write data buffer to a cache and invalidating state and constant caches associated with the one or more particular processing resources that executed the first command.

12. The method of claim 10, comprising:
in response to completion of the third command and an unexecuted command from the one or more particular sources of the first command, based on the first configuration, allocating one or more of the particular processing resources formerly allocated to execute the third command to perform the unexecuted command from the second source.

13. The method of claim 10, wherein the first command is associated with a compute context or a render context and based on completion of execution of the first command, permitting access to the compute context or the render context for use by the second command.

14. The method of claim 10, comprising:
in response to receipt of a fourth command associated with a third source, allocating one or more of the particular processing resources to perform the fourth command based on the first configuration.

15. A non-transitory computer-readable medium comprising instructions stored thereon, that if executed by one or more processors, cause the one or more processors to:
dispatch a first command for execution by a first set of one or more processing resources of a graphics processing unit (GPU) based on a first configuration that indicates the first set of one or more particular processing resources of the GPU are restricted to execute commands from one or more particular sources and based on a second configuration that indicates a second set of one or more particular processing resources of the GPU restricted to perform operations for the one or more particular sources of the first command, dispatch a second command to the second set of one or more particular processing resources of the GPU, wherein the second set of one or more particular processing resources of the GPU is at least partially different than the first set of one or more particular processing resources of the GPU, and wherein the second command is provided by the one or more particular sources of the first command.

16. The non-transitory computer-readable medium of claim 15, comprising instructions stored thereon, that if executed by one or more processors, cause the one or more processors to:
in response to receipt of a third command from a second source while the first command is executing:
based on the first configuration indicating that the second source is permitted to execute a command on the one or more particular processing resources that execute the first command:
permit the first command to complete execution on the first set of one or more particular processing resources and
allocate the third command for execution on one or more particular processing resources that previously executed the first command.

17. The non-transitory computer-readable medium of claim 16, comprising instructions stored thereon, that if executed by one or more processors, cause the one or more processors to:
after completion of the first command, flush a write data buffer to a cache and invalidate state and constant caches associated with the one or more particular processing resources that executed the first command.

18. The non-transitory computer-readable medium of claim 16, comprising instructions stored thereon, that if executed by one or more processors, cause the one or more processors to:
in response to completion of the third command and an unexecuted command from the one or more particular sources of the first command, based on the first configuration, allocating one or more of the particular processing resources formerly allocated to execute the third command to perform the unexecuted command from the second source.

19. The non-transitory computer-readable medium of claim 16, wherein the first command is associated with a compute context or a render context and based on completion of execution of the first command, permitting access to the compute context or the render context for use by the second command.

20. The non-transitory computer-readable medium of claim 16, comprising instructions stored thereon, that if executed by one or more processors, cause the one or more processors to:
in response to receipt of a fourth command associated with a third source, allocating one or more of the particular processing resources to perform the fourth command based on the first configuration.

21. The apparatus of claim 1, wherein based on utilization of a third configuration, the circuitry is to adjust particular processing resources of the GPU permitted to perform operations for the source of the first command.

* * * * *